United States Patent
Okazaki et al.

(10) Patent No.: US 8,554,447 B2
(45) Date of Patent: Oct. 8, 2013

(54) INTERNAL COMBUSTION ENGINE SYSTEM CONTROLLER

(75) Inventors: Shuntaro Okazaki, Shizuoka-ken (JP); Koji Ide, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/459,967

(22) Filed: Apr. 30, 2012

(65) Prior Publication Data

US 2012/0290192 A1 Nov. 15, 2012

Related U.S. Application Data

(63) Continuation of application No. PCT/JP2009/068940, filed on Oct. 29, 2009.

(51) Int. Cl.
- *B60T 7/12* (2006.01)
- *G05D 1/00* (2006.01)
- *G06F 7/00* (2006.01)
- *G06F 17/00* (2006.01)

(52) U.S. Cl.
USPC ........... 701/104; 701/103; 701/109; 123/672; 123/673; 123/674; 123/675

(58) Field of Classification Search
USPC ................... 123/673–695; 701/103, 104, 109
See application file for complete search history.

(56) References Cited

U.S. PATENT DOCUMENTS

| | | | | |
|---|---|---|---|---|
| 5,983,629 A | * | 11/1999 | Sawada | 60/276 |
| 6,382,198 B1 | * | 5/2002 | Smith et al. | 123/673 |
| 6,837,231 B1 | * | 1/2005 | Herrin | 123/684 |
| 6,904,899 B2 | * | 6/2005 | Kato | 123/674 |
| 7,027,910 B1 | * | 4/2006 | Javaherian et al. | 701/111 |
| 7,204,080 B2 | * | 4/2007 | Nakagawa | 60/285 |
| 7,278,394 B2 | * | 10/2007 | Okazaki et al. | 123/305 |

FOREIGN PATENT DOCUMENTS

| | | | |
|---|---|---|---|
| JP | 63-219847 A | | 9/1988 |
| JP | 9112310 A | | 4/1997 |
| JP | 2004-183585 A | | 7/2004 |
| JP | 2004204716 A | * | 7/2004 |
| JP | 2004-316523 A | | 11/2004 |

(Continued)

OTHER PUBLICATIONS

English language translation of International Preliminary Report on Patentability issued Jun. 11, 2012 in Application No. PCT/JP2009/068940.

*Primary Examiner* — Stephen K Cronin
*Assistant Examiner* — Joseph Dallo
(74) *Attorney, Agent, or Firm* — Gifford, Krass, Sprinkle, Anderson & Citkowski, P.C.

(57) ABSTRACT

Provided is an internal combustion engine system controller, including a sub-feedback learning section, a state determining section, and a learning update-speed setting section. The state determining section determines, to which of at least three states including: (a) a stable state in which a fluctuating state of a sub-feedback learning value is stable; (b) an unstable state in which the fluctuating state greatly fluctuates; and (c) an intermediate state between the stable state and the instable state (may be referred to as sub-stable state), the fluctuating state corresponds. The learning update-speed setting section sets an update speed of the sub-feedback learning value in accordance with the result of determination by the state determining section. Further, the learning update-speed setting section suppresses the occurrence of hunting of the sub-feedback learning value.

12 Claims, 17 Drawing Sheets

(56) References Cited

FOREIGN PATENT DOCUMENTS

| | | |
|---|---|---|
| JP | 2006-104978 A | 4/2006 |
| JP | 2009-030455 A | 2/2009 |
| JP | 2009-074388 A | 4/2009 |
| JP | 2009-162139 A | 7/2009 |
| JP | 2009-180145 A | 8/2009 |
| JP | 2009-209861 A | 9/2009 |
| WO | 2009013600 A2 | 1/2009 |
| WO | 2009110170 A1 | 9/2009 |
| WO | 2010087026 A1 | 8/2010 |

* cited by examiner

INTERNAL COMBUSTION ENGINE SYSTEM CONTROLLER

This is a continuation of International Application PCT/JP2009/068940, with an international filing date of Oct. 29, 2009.

BACKGROUND OF THE INVENTION

1. Field of the Invention

The present invention relates to an internal combustion engine system controller for controlling an internal combustion engine system including an internal combustion engine having a plurality of cylinders (hereinafter, referred to as "multi-cylinder internal combustion engine").

2. Description of the Related Art

Conventionally, a device for controlling an air-fuel ratio based on output signals from an upstream-side air-fuel ratio sensor (hereinafter, referred to as "A/F sensor") and a downstream-side air-fuel ratio sensor (hereinafter, referred to as "$O_2$ sensor") respectively provided in an exhaust passage on an upstream side and a downstream side of an exhaust-gas purification catalyst is known (for example, see Japanese Patent Application Laid-open Nos. 2004-183585 and 2006-104978 and the like). The A/F sensor is an oxygen sensor exhibiting linear output characteristics with respect to the air-fuel ratio. On the other hand, the $O_2$ sensor is an oxygen sensor exhibiting so-called Z-characteristics (characteristics in which an output changes in a stepwise manner in a mode in which an output abruptly changes between a rich side and a lean side with respect to a stoichiometric air-fuel ratio as a reference) with respect to the air-fuel ratio.

In the above-mentioned type of device, a fuel injection amount is subjected to feedback control so that the air-fuel ratio of an exhaust gas flowing into the exhaust-gas purification catalyst (hereinafter, referred to simply as "catalyst") becomes equal to a target air-fuel ratio based on the output signal from the A/F sensor (hereinafter, the control is referred to as "main feedback control"). With the main feedback control, control for feeding-back the output signal from the $O_2$ sensor to the fuel injection amount is also performed (hereinafter, the control is referred to as "sub-feedback control").

More specifically, in the main feedback control, a feedback correction amount is calculated based on a deviation between the air-fuel ratio of the exhaust gas, corresponding to the output from the A/F sensor, and the target air-fuel ratio. On the other hand, in the sub-feedback control, a sub-feedback amount (sub-feedback correction amount) is calculated based on the output signal from the $O_2$ sensor. Then, the sub-feedback amount is fed-back to the main feedback control to correct the deviation between the air-fuel ratio of the exhaust gas, corresponding to the output from the A/F sensor, and the target air-fuel ratio.

In the sub-feedback control, a steady component contained in the sub-feedback amount is acquired as a sub-feedback learning value. The sub-feedback learning value corresponds to a constant error contained in the output signal from the A/F sensor. Therefore, by the feedback of the sub-feedback learning value to the main feedback control, the above-mentioned constant error is compensated for. As a result, an actual air-fuel ratio can be made closer to the target air-fuel ratio quickly after the start of correction of the air-fuel ratio by the sub-feedback control.

The above-mentioned sub-feedback control learning value is also used to determine whether or not a deviation in actual air-fuel ratio among a plurality of cylinders has become excessive and to determine the occurrence of an accidental fire (for example, see Japanese Patent Application Laid-open No. 2009-30455 and the like; the details of the determinations of occurrence of an abnormality described above are described with the description of an embodiment of the present invention).

As described above, the sub-feedback learning value is extremely useful and important in various usages of the above-mentioned type of device. Therefore, various configurations have been conventionally proposed so that the sub-feedback learning value quickly converges with high accuracy (for example, see Japanese Patent Application Laid-open Nos. 2009-162139 and 2009-180145 and the like).

SUMMARY OF THE INVENTION

If a learning speed, that is, an update speed (an update amount or an update frequency) of the sub-feedback learning value is not appropriately set in the above-mentioned type of device, there is a risk of a problem such as hunting of the sub-feedback learning value. The present invention has been made to solve the problem described above and therefore, has an object to prevent the occurrence of hunting of a sub-feedback learning value to allow the sub-feedback learning value to more quickly converge.

(Configuration)

An internal combustion engine system to which the present invention is to be applied includes a multi-cylinder internal combustion engine, a plurality of fuel injection valves, a catalyst, a downstream-side air-fuel ratio sensor, and an upstream-side air-fuel ratio sensor.

The plurality of fuel injection valves are provided so as to respectively correspond to a plurality of cylinders.

The catalyst is disposed (provided) in an exhaust passage on a downstream side of an exhaust-gas accumulating section, in which an exhaust gas from the plurality of cylinders accumulates, in an exhaust-gas flowing direction.

The downstream-side air-fuel ratio sensor is disposed at a position of the exhaust passage, which is located on the downstream side of the catalyst in the exhaust-gas flowing direction, so as to generate an output corresponding to an air-fuel ratio of the exhaust gas at the position where the downstream-side air-fuel ratio sensor is disposed.

The upstream-side air-fuel ratio sensor is disposed at a position of the exhaust passage, which is located on the upstream side of the catalyst and the downstream-side air-fuel ratio sensor in the exhaust-gas flowing direction, so as to generate an output corresponding to the air-fuel ratio of the exhaust gas at the position where the upstream-side air-fuel ratio sensor is disposed.

An internal combustion engine system controller (hereinafter, referred to simply as "controller") of the present invention is configured to control the internal combustion engine system. Specifically, the controller includes a sub-feedback learning portion, a state determining portion, and a learning update-speed setting portion.

The sub-feedback learning portion is configured to acquire the sub-feedback learning value which is an amount corresponding to a steady component of a sub-feedback amount. The sub-feedback amount is a control amount for performing feedback control of a fuel injection amount by the fuel injection valves so that an air-fuel ratio of an exhaust gas, corresponding to an output of the downstream-side air-fuel ratio sensor, becomes equal to a stoichiometric air-fuel ratio.

The state determining portion is configured to determine, to which of at least three states including:

(a) a stable state in which the fluctuating state of the sub-feedback learning value is stable;

(b) an unstable state in which the fluctuating state greatly fluctuates; and (c) an intermediate state between the stable state and the unstable state (may be referred to as sub-stable state), the fluctuating state of the sub-feedback learning value corresponds.

The learning update-speed setting portion is configured to set an update speed of the sub-feedback learning value by the sub-feedback learning portion in accordance with the result of determination by the state determining portion. The learning update-speed setting portion sets the update speed so that the update speed becomes larger in the unstable state than in the intermediate state and becomes larger in the intermediate state than in the stable state.

One feature of the present invention resides in that the learning update-speed setting portion is configured to gradually change the update speed (typically, when the result of determination by the state determining portion becomes different) so as to suppress the occurrence of hunting of the sub-feedback learning value.

Another feature of the present invention resides in that the learning update-speed setting portion is configured to allow the update speed to be changed when a transition pattern of a fluctuating state of the sub-feedback learning value determined by the state determining portion is identical with a predetermined pattern. In this case, the state determining portion may determine the fluctuating state of the sub-feedback learning value so that the fluctuating state shifts between the stable state and the intermediate state or between the intermediate state and the unstable state.

A further feature of the present invention resides in that the state determining portion is configured to include a lowpass filter to operate in the manner described below. In the above-mentioned configuration, the state determining portion may change a parameter of the lowpass filter in accordance with the result of determination of the fluctuating state.

When the sub-feedback learning value falls within the range of a predetermined first determination width from a criterion value obtained by processing the sub-feedback learning value with the lowpass filter, the result of determination of the fluctuating state is shifted by one step from the unstable state to the intermediate state. On the other hand, when the sub-feedback learning value does not fall within the range of a predetermined second determination width which is smaller than the first determination width from the criterion value, the result of determination of the fluctuation is shifted by one step from the intermediate state to the unstable state.

Further, when the sub-feedback learning value falls within the range of a predetermined third determination width from the criterion value, the result of determination of the fluctuating state is shifted by one step from the intermediate state to the stable state. The third determination width may be set equal to or smaller than the second determination width. On the other hand, when the sub-feedback learning value does not fall within the range of a predetermined fourth determination width smaller than the third determination width from the criterion value, the result of determination of the fluctuating state is shifted by one step from the stable state to the intermediate state.

The controller of the present invention may further include abnormality determining portion. The abnormality determining portion is configured to determine whether or not an abnormality has occurred in the internal combustion engine system based on the sub-feedback learning value. For example, the abnormality determining portion is configured to make an imbalance abnormality determination. The imbalance abnormality determination is for determining whether or not an imbalance abnormality has occurred, that is, whether or not a deviation among air-fuel ratios of the plurality of cylinders has become excessive.

(Actions and Effects)

In the controller of the present invention, which has the configuration described above, the sub-feedback learning value is acquired (updated) by the sub-feedback learning portion, corresponding to the steady component of the sub-feedback amount. At this time, the update speed of the sub-feedback learning value is set by the learning update-speed setting portion in accordance with the result of determination by the state determining portion.

Specifically, the state determining portion determines, to which of at least three states, that is, the stable state, the unstable state, and the intermediate state, the fluctuating state of the sub-feedback learning value corresponds. More specifically, for example, the result of determination (set state) of the fluctuating state is shifted between the stable state, the unstable state, and the intermediate state in accordance with the state of acquisition (update) of the sub-feedback learning value by the sub-feedback learning portion.

The learning update-speed setting portion sets the update speed of the sub-feedback learning value by the sub-feedback learning portion in accordance with the result of determination (set state) by the state determining portion. More specifically, for example, the learning update-speed setting portion gradually changes the update speed when the result of determination by the state determining portion becomes different. Alternatively, for example, when the transition pattern of the fluctuating state is identical with the predetermined pattern, the learning update-speed setting portion permits the update speed to be changed.

As described above, in the controller of the present invention, the update speed of the sub-feedback learning value by the sub-feedback learning portion is appropriately set in accordance with the fluctuating state of the sub-feedback learning value. Therefore, according to the present invention, the hunting of the sub-feedback learning value is suppressed as quickly as possible. As a result, the sub-feedback learning value more quickly converges.

DETAILED DESCRIPTION OF THE PREFERRED EMBODIMENT

Hereinafter, an embodiment of the present invention is described referring to the accompanying drawings.

1. Schematic Configuration of Internal Combustion Engine System

Figure 1:
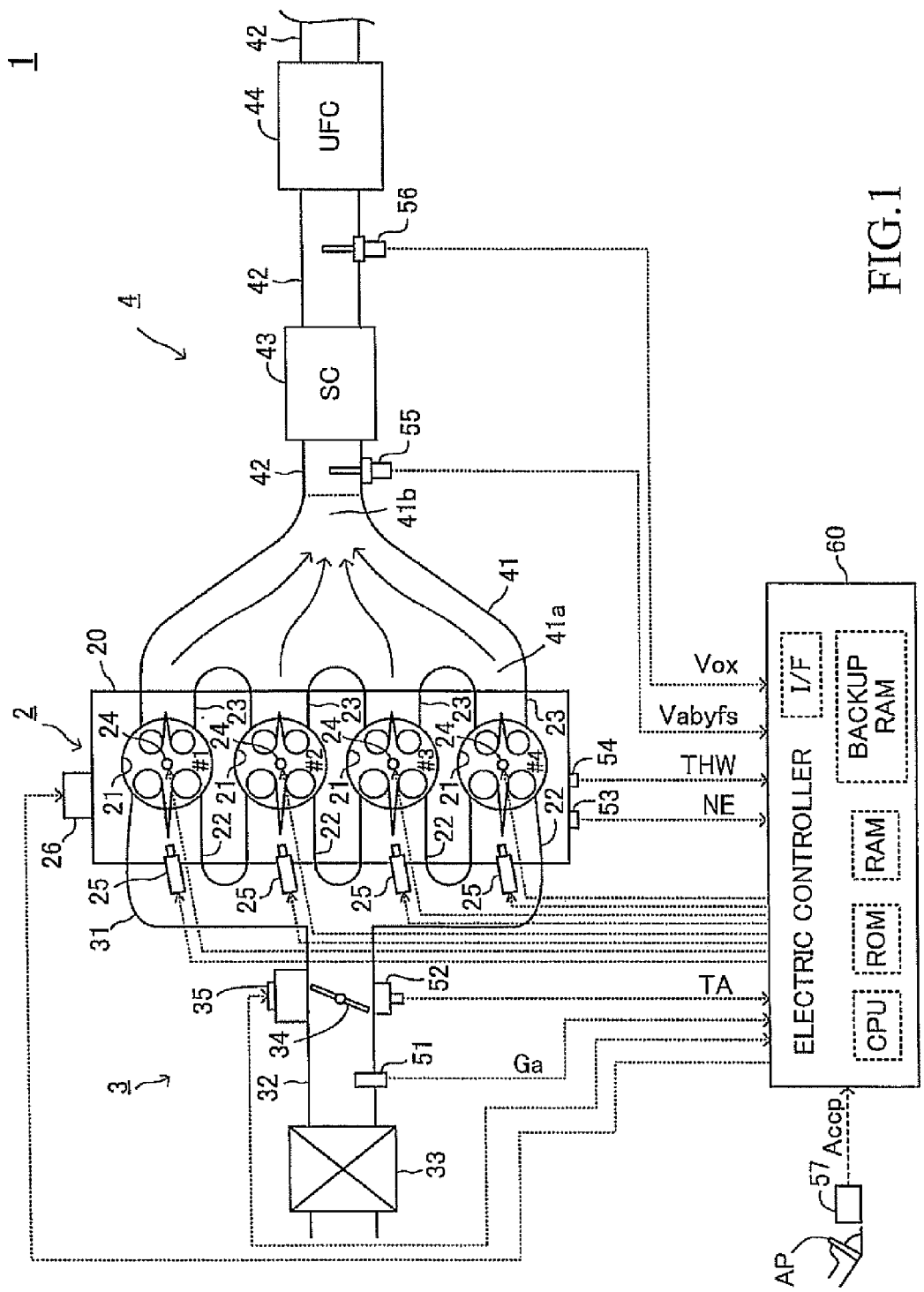
FIG. 1 is a schematic diagram illustrating an overall configuration of an internal combustion engine system to which an embodiment of the present invention is applied.

FIG. 1 is a schematic diagram illustrating an overall configuration of an internal combustion engine system 1 to which an embodiment of the present invention is applied. The internal combustion engine system 1 includes a four-cycle spark ignition type multi-cylinder internal combustion engine 2 (hereinafter, referred to simply as "engine 2"), an intake system 3, and an exhaust system 4. Hereinafter, a configuration of each section of the internal combustion engine system 1 is described.

(1-1. Multi-Cylinder Internal Combustion Engine)

In a main body 20 of the engine 2, a plurality of cylinders 21 are provided. Specifically, in this example, four cylinders 21 (a first cylinder #1, a second cylinder #2, a third cylinder #3, and a fourth cylinder #4) are arranged in series. A plurality of intake ports 22 and a plurality of exhaust ports 23 are formed to so as to be provided to the main body 20 so that each of the number of intake ports 22 and the number of exhaust ports 23 corresponds to the number of cylinders 21.

The intake ports 22 are passages for supplying an air-fuel mixture (mixture gas of air and a fuel; hereinafter, referred to simply as "mixture") to the cylinders (combustion chambers) 21. The exhaust ports 23 are passages for exhausting a combusted gas from the cylinders (combustion chambers) 21 (an exhaust gas is a gas exhausted from the cylinders 21 through the exhaust ports 23). The main body 20 of the engine 2 is configured so that the intake ports 22 are opened and closed by intake valves (not shown) and the exhaust ports 23 are opened and closed by exhaust valves (not shown) (the detailed description of the configuration described above is herein omitted because the configuration is well-known).

A plurality of (four in this example) spark plugs 24 are mounted to the main body 20 so that the number of spark plugs 24 corresponds to the number of cylinders 21. Each of the spark plugs 24 generates an ignition spark from a spark generating section in response to an ignition signal. Each of the spark plugs 24 is provided so that the above-mentioned spark generating section is located on the top of a corresponding one of the cylinders (combustion chambers) 21 and is exposed in a middle portion in a radial direction of the corresponding one of the cylinders.

Moreover, a plurality of (four in this example) injectors (fuel injection valves) 25 are fixed to the main body 20 so that the number of injectors 25 corresponds to the number of cylinders 21. The injectors 25 are provided to the intake ports 22 one by one (specifically, one injector 25 is provided to each cylinder 21). Each of the injectors 25 is configured to inject an instructed injection amount of fuel, which is contained in the injection instruction signal, to a corresponding one of the intake ports 22 in response to an injection instruction signal in a normal case. In this manner, the engine 2 is configured so that the fuel is supplied to each of the plurality of cylinders 21 independently of the other cylinders 21.

Further, an intake-valve controller 26 is provided to the main body 20 of the engine 2. The intake-valve controller 26 has a well-known configuration for adjusting and controlling a relative rotation angle (phase angle) between an intake camshaft (not shown) and an intake cam (not shown) by a hydraulic pressure. The intake-valve controller 26 is actuated based on an instruction signal (driving signal) to be able to change valve-opening timing (intake-valve opening timing) of the intake valves (not shown).

(1-2. Intake/Exhaust Systems)

The intake system 3 includes an intake manifold 31, an intake pipe 32, an air filter 33, a throttle valve 34, and a throttle-valve actuator 35.

The intake manifold 31 includes a plurality of branch portions respectively connected to the intake ports 22 and a surge tank portion in which the branch portions gather together. The intake pipe 32 is connected to the surge tank portion. The intake manifold 31, the intake pipe 32, and the plurality of intake ports 22 constitute an intake passage. The air filter 33 is provided at an end of the intake pipe 32 on the upstream side in an intake-gas flowing direction.

The throttle valve 34 is rotatably mounted in the intake pipe 32, at a position between the air filter 33 and the intake manifold 31. The throttle valve 34 is configured to rotate to change a sectional area of an opening of the intake passage formed by the intake pipe 32. The throttle-valve actuator 35 includes a DC motor and allows the throttle valve 34 to rotate in response to an instruction signal (driving signal).

The exhaust system 4 includes an exhaust manifold 41, an exhaust pipe 42, an upstream-side catalyst 43, and a downstream-side catalyst 44.

The exhaust manifold 41 includes a plurality of branch portions 41a respectively connected to the exhaust ports 23 and a gathering portion (exhaust gathering portion) 41b in which the branch portions 41a gather together. The exhaust pipe 42 is connected to the gathering portion 41b of the exhaust manifold 41. The exhaust manifold 41, the exhaust pipe 42, and the plurality of exhaust ports 32 constitute an exhaust passage (passage through which the exhaust gas passes).

The upstream-side catalyst 43 is a so-called three-way catalyst having a function of storing and releasing oxygen (hereinafter, referred to as "oxygen storage function") and is disposed (provided) in the exhaust pipe 42. Specifically, the upstream-side catalyst 43 is disposed in the exhaust passage on the downstream side of the gathering portion 41b in an exhaust-gas flowing direction. The upstream-side catalyst 43 demonstrates a catalytic action of simultaneously purifying unburned substances (HC, CO, $H_2$, and the like) and a nitrogen oxide (NOx) with the oxygen storage function when a temperature thereof reaches a predetermined activating temperature. The catalytic action described above can also be described as a purification action by oxidizing hydrogen $H_2$, to detect an imbalance abnormality (an abnormality in which a deviation in air-fuel ratio among the plurality of cylinders 21 becomes excessive).

The downstream-side catalyst 44 is a so-called three-way catalyst similar to the upstream-side catalyst 43 and is provided (disposed) in the exhaust pipe 42 on the downstream side of the upstream-side catalyst 43 in the exhaust-gas flowing direction.

(1-3. Various Sensors)

The internal combustion engine system 1 of this embodiment includes a hot-wire airflow meter 51, a throttle-position sensor 52, an engine rotation-speed sensor 53, a water-temperature sensor 54, an upstream-side air-fuel ratio sensor 55, a downstream-side air-fuel ratio sensor 56, and an accelerator opening-degree sensor 57.

The hot-wire airflow meter 51 is disposed in the intake pipe 32, at a position between the air filter 33 and the throttle valve 34. The hot-wire airflow meter 51 is configured to output a signal in accordance with a mass flow rate of intake air flowing through the intake pipe 32, that is, a signal indicating an intake air amount Ga of the engine 2 per unit time.

The throttle-position sensor 52 is mounted to the intake pipe 32 at a position corresponding to the throttle valve 34. The throttle-position sensor 52 is configured to output a signal in accordance with the degree of opening of the throttle valve 34, that is, a signal indicating a throttle-valve opening-degree TA.

The engine rotation-speed sensor 53 is mounted to the main body 20 of the engine 2 at a position corresponding to the intake camshaft (not shown). The engine rotation-speed sensor 53 is configured to output a signal which has a pulse with a small width for each 5-degree revolution of the intake camshaft and a pulse with a large width for each 360-degree revolution of the intake camshaft (signal serving as a basis of acquisition of an engine rotation speed NE and an absolute crank angle).

The water-temperature sensor 54 is mounted to the main body 20 of the engine 2. The water-temperature sensor 54 is configured to output a signal in accordance with a temperature of cooling water of the internal combustion engine 2, that is, a signal indicating a cooling-water temperature THW.

The upstream-side air-fuel ratio sensor 55 is a well-known so-called limiting-current type wide-range air-fuel ratio sensor and is provided to the exhaust passage (the exhaust manifold 41 or the exhaust pipe 42) at a position between the gathering portion 41b of the exhaust manifold 41 and the upstream-side catalyst 43. The upstream-side air-fuel ratio sensor 55 is configured to generate an output value Vabyfs in accordance with an air-fuel ratio (upstream-side air-fuel ratio "abyfs") of the exhaust gas flowing through the position at which the upstream-side air-fuel ratio sensor 55 is provided. The details of an internal structure of the upstream-side air-fuel ratio sensor 55 are described below.

The downstream-side air-fuel ratio sensor 56 is a well-known so-called concentration-cell type oxygen concentration sensor ($O_2$ sensor) and is provided to the exhaust passage (exhaust pipe 42) at a position between the upstream-side catalyst 43 and the downstream-side catalyst 44. The downstream-side air-fuel ratio sensor 56 is configured to generate an output value Voxs in accordance with an air-fuel ratio (downstream-side air-fuel ratio "afdown") of the exhaust gas flowing through the position at which the downstream-side air-fuel ratio sensor 56 is provided.

The accelerator opening-degree sensor 57 is configured to detect the amount of operation of an accelerator pedal AP operated by a driver so as to output a signal indicating an operation amount Accp of the accelerator pedal AP.

2. Schematic Configuration of Controller

The electric controller 60 corresponding to one embodiment of the present invention is a device for controlling the operation of the internal combustion engine system 1, and more specifically, is an air-fuel ratio controller for controlling an air-fuel ratio of the engine 2. The air-fuel ratio controller is also an imbalance abnormality determining device. Further, the air-fuel ratio controller is also a fuel injection amount controller for controlling the fuel injection amount.

The electric controller 60 constitutes each portion of the present invention (sub-feedback learning portion, state determining portion, learning update-speed setting portion, and abnormality determining portion). More specifically, the electric controller 60 is a well-known microcomputer including a CPU, a ROM, a RAM, a backup RAM, an interface (including an AD converter), and the like. The electric controller 60 is electrically connected to operating sections such as the ignition plugs 24 and the injectors 25 and the above-mentioned various sensors provided in the internal combustion engine system 1 through an intermediation of the interface.

Specifically, the electric controller 60 is configured to receive output signals from various sensors described above through an intermediation of the interface and transmit an instruction signal (driving signal) for controlling the operation of each of the operating sections described above to each of the operating sections through an intermediation of the interface based on the result of computation by the CPU in accordance with the output signals.

More specifically, for example, the electric controller 60 is configured to acquire a crank angle (absolute crank angle) of the engine 2 based on signals from the engine rotation-speed sensor 53 and the crank-angle sensor (not shown). Moreover, the electric controller 60 is configured to convert the signal output from the engine rotation-speed sensor 53 into a signal indicating the engine rotation speed NE. Further, the electric controller 60 is configured to transmit an instruction signal to the throttle-valve actuator 35 so that the throttle-valve opening degree TA becomes larger as the acquired operation amount Accp of the accelerator pedal AP becomes larger.

3. Details of Configuration of Air-Fuel Ratio Sensor

Figure 2:
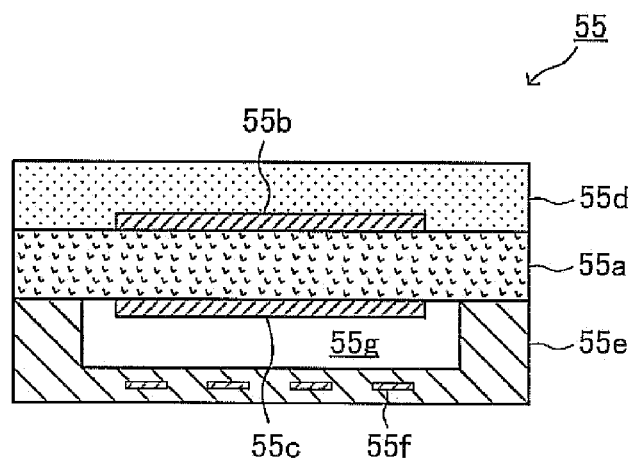
FIG. 2 is a sectional view illustrating a schematic configuration of an upstream-side air-fuel ratio sensor illustrated in FIG. 1.

FIG. 2 is a sectional view illustrating a schematic configuration of the upstream-side air-fuel ratio sensor 55 illustrated in FIG. 1. As illustrated in FIG. 2, the upstream-side air-fuel ratio sensor 55 includes a solid electrolyte layer 55a, an exhaust-gas side electrode layer 55b, an atmosphere-side electrode layer 55c, a diffusion resistance layer 55d, a partition-wall portion 55e, and a heater 55f.

The solid electrolyte layer 55a is an oxide sintered body having oxygen-ion conductivity, and in this example, is a so-called stabilized zirconia element in which CaO is solved in $ZrO_2$ (zirconia) as a stabilizer. The solid electrolyte layer 55a is configured to demonstrate well-known oxygen-cell characteristic and oxygen-pump characteristic when having a temperature equal to or higher than an activating temperature. The oxygen-cell characteristic is a characteristic of generating an electromotive force by allowing oxygen ions to pass from a high oxygen-concentration side to a low oxygen-concentration side. The oxygen-pump characteristic is a characteristic of migrating oxygen ions from a cathode (low potential side electrode) to an anode (high potential side electrode) in an amount depending on a potential difference between the electrodes when the potential difference is applied to both ends of the solid electrolyte layer 55a. The above-mentioned characteristics are to be demonstrated when the upstream-side air-fuel ratio sensor 55 outputs the output value in accordance with the air-fuel ratio of the exhaust gas as described below.

The exhaust-gas side electrode layer 55b is provided on "one surface" of the solid electrolyte layer 55a. The atmosphere-side electrode layer 55c is provided on the other surface so as to be opposed to the exhaust-gas side electrode layer 55b through the solid electrolyte layer 55a therebetween. The exhaust-gas side electrode layer 55b and the atmosphere-side electrode layer 55c are made of a precious metal having high catalyst activity such as platinum (Pt) and are formed in a porous fashion by chemical plating or the like so as to have sufficiently high gas permeability.

The diffusion resistance layer (diffusion rate controlling layer) 55d is provided so as to cover the "one surface" of the solid electrolyte layer 55a and the exhaust-gas side electrode layer 55b provided thereon. The diffusion resistance layer 55d is made of a porous ceramic (heat-resistance inorganic substance) and is formed by plasma spraying or the like.

A speed of diffusion of hydrogen $H_2$ in the diffusion resistance layer 55d is higher than those of hydrocarbon HC and carbon monoxide CO which have a relatively large molecular diameter. Therefore, hydrogen $H_2$ reaches the exhaust-gas side electrode layer 55b more quickly than hydrocarbon HC and carbon monoxide CO owing to the presence of the diffusion resistance layer 55d. For the above-mentioned reason, the upstream-side air-fuel ratio sensor 55 is located so that an outer surface of the diffusion resistance layer 55d (surface on the side opposite to the surface facing the exhaust-gas side electrode layer 55b) is exposed to the exhaust gas (comes into contact with the exhaust gas exhausted from the engine 2).

The partition-wall portion 55e is made of an alumina ceramic which is dense enough not to permeate a gas and is formed to have approximately U-like shape in a side cross section. The partition-wall portion 55e is bonded to the solid electrolyte layer 55a so as to form an atmospheric chamber 55g (space for housing the atmosphere-side electrode layer 55c) between the partition-wall portion 55e and the solid electrolyte layer 55a by closing an opening end thereof with the solid electrolyte layer 55a. In the atmospheric chamber 55g, the atmosphere is introduced.

The heater 55f are embedded in the partition-wall portion 55e. The heater 55f is configured to generate heat when being energized, thereby heating the solid electrolyte layer 55a.

4. Description of Operations of Air-Fuel Ratio Sensors

Hereinafter, the operations of the upstream-side air-fuel ratio sensor 55 and the downstream-side air-fuel ratio sensor 56 illustrated in FIGS. 1 and 2 are described.

Figure 3:
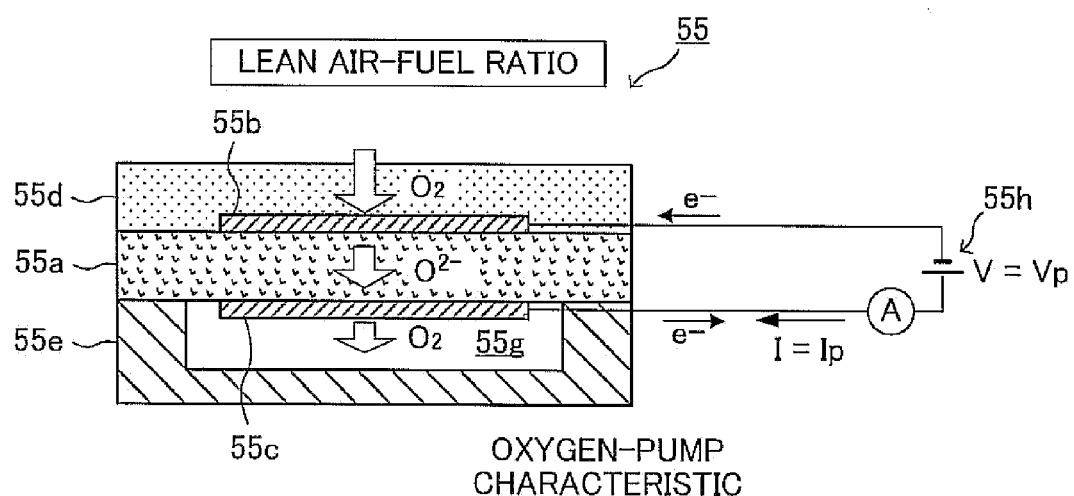
FIG. 3 is a diagram for illustrating an operation of the upstream-side air-fuel ratio sensor illustrated in FIG. 2 when an air-fuel ratio of an exhaust gas is on a lean side of a stoichiometric air-fuel ratio.

As illustrated in FIG. 3, a voltage V is applied to the upstream-side air-fuel ratio sensor 55 by a power source 55h so that a potential on the atmosphere-side electrode layer 55c becomes high and a potential on the exhaust-gas side electrode layer 55b becomes low.

When the air-fuel ratio of the exhaust gas is on the lean side of a stoichiometric air-fuel ratio, the air-fuel ratio is detected by the above-mentioned oxygen-pump characteristic. Specifically, in this case, a large amount of oxygen molecules contained in the exhaust gas passes through the diffusion resistance layer 55d to reach the exhaust-gas side electrode layer 55b. The oxygen molecules receive electrons in the exhaust-gas side electrode layer 55b to be oxygen ions. The oxygen ions pass through the solid electrolyte layer 55a and then release the electrons in the atmosphere-side electrode layer 55c to be oxygen molecules. As a result, a current I flows from a positive electrode of the power source 55h through the atmosphere-side electrode layer 55c, the solid electrolyte layer 55a, and the exhaust-gas side electrode layer 55b to a negative electrode of the power source 55h.

Figure 4:
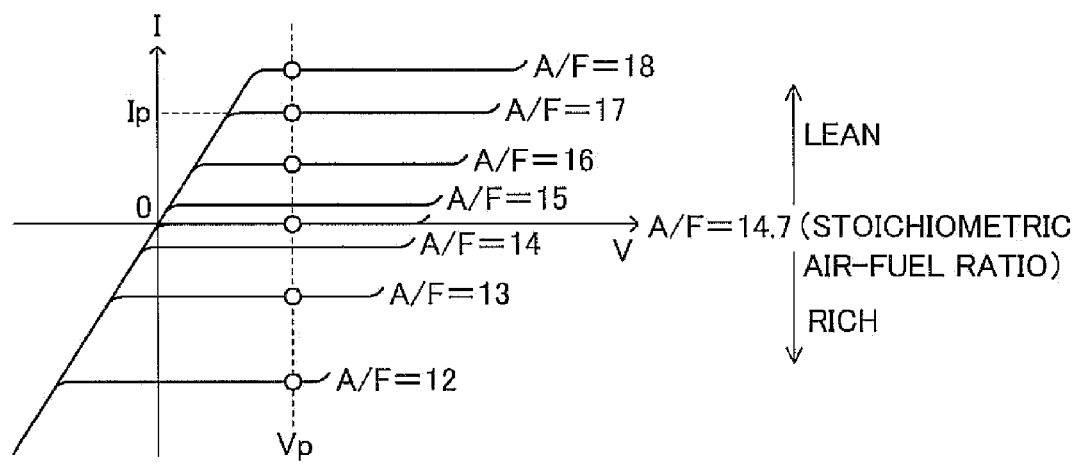
FIG. 4 is a graph showing the relation between a limiting current value and the air-fuel ratio of the exhaust gas in the upstream-side air-fuel ratio sensor illustrated in FIG. 2.

When the magnitude of the voltage V is set to a predetermined value Vp or larger, the magnitude of the current I changes in accordance with the amount of oxygen molecules passing through the diffusion resistance layer 55d to reach the exhaust-gas side electrode layer 55b by diffusion among all the oxygen molecules contained in the exhaust gas reaching the outer surface of the diffusion resistance layer 55d. Specifically, the magnitude of the current I changes in accordance with an oxygen concentration (oxygen partial pressure) in the exhaust-gas side electrode layer 55b. The oxygen concentration in the exhaust-gas side electrode layer 55b changes in accordance with the oxygen concentration of the exhaust gas reaching the outer surface of the diffusion resistance layer 55d. The current I does not change even when the voltage V is set equal to or higher than the predetermined value Vp, as shown in FIG. 4 and therefore, is referred to as the "limiting current Ip". The air-fuel ratio sensor 55 outputs a value in accordance with the air-fuel ratio based on the value of the limiting current Ip.

Figure 5:
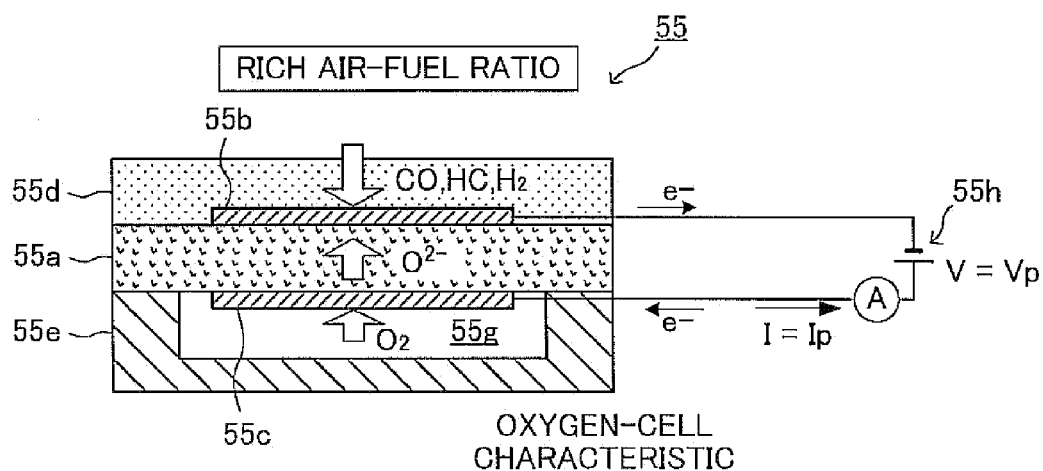
FIG. 5 is a diagram for illustrating the operation of the upstream-side air-fuel ratio sensor illustrated in FIG. 2 when the air-fuel ratio of the exhaust gas is on a rich side of the stoichiometric air-fuel ratio.

On the other hand, when the air-fuel ratio of the exhaust gas is on the rich side of the stoichiometric air-fuel ratio, the air-fuel ratio is detected by the oxygen-cell characteristic described above, as illustrated in FIG. 5. Specifically, in this case, a large amount of unburned substances (HC, CO, $H_2$, and the like) contained in the exhaust gas passes through the diffusion resistance layer 55d to reach the exhaust-gas side electrode layer 55b. Then, a difference between the oxygen concentration of the atmosphere-side electrode layer 55c and the oxygen concentration of the exhaust-gas side electrode layer 55b (difference in oxygen partial pressure) becomes large. As a result, the solid electrolyte layer 55a functions as the oxygen cell (the voltage V to be applied is set so as to be smaller than an electromotive force of the oxygen cell).

Therefore, the oxygen molecules present in the atmospheric chamber 55g receive the electrons in the atmosphere-side electrode layer 55c to be oxygen ions. The oxygen ions pass through the solid electrolyte layer 55a to migrate to the exhaust-gas side electrode layer 55b to release the electrons when oxidizing the unburned substances in the exhaust-gas side electrode layer 55b. As a result, the current I flows from the negative electrode of the power source 55h through the exhaust-gas side electrode layer 55b, the solid electrolyte layer 55a, and the atmosphere-side electrode layer 55c to the positive electrode of the power source 55h.

The magnitude of the current I is determined by the amount of oxygen ions passing from the atmosphere-side electrode layer 55c through the solid electrolyte layer 55a to reach the exhaust-gas side electrode layer 55b. As described above, the oxygen ions are used to oxidize the unburned substances in the exhaust-gas side electrode layer 55b. Therefore, as the amount of unburned substances passing through the diffusion resistance layer 55d to reach the exhaust-gas side electrode layer 55b by the diffusion becomes larger, the amount of oxygen ions passing through the solid electrolyte layer 55a becomes larger. In other words, as the air-fuel ratio becomes smaller (the air-fuel ratio is on the rich side of the stoichiometric air-fuel ratio and therefore, the amount of unburned substances is larger), the magnitude of the current I becomes larger. However, the amount of unburned substances reaching the exhaust-gas side electrode layer 55b is limited by the presence of the diffusion resistance layer 55d. Thus, the current I has the constant value Ip in accordance with the air-fuel ratio. The upstream-side air-fuel ratio sensor 55 outputs a value in accordance with the air-fuel ratio based on the value of the limiting current Ip.

Figure 6:
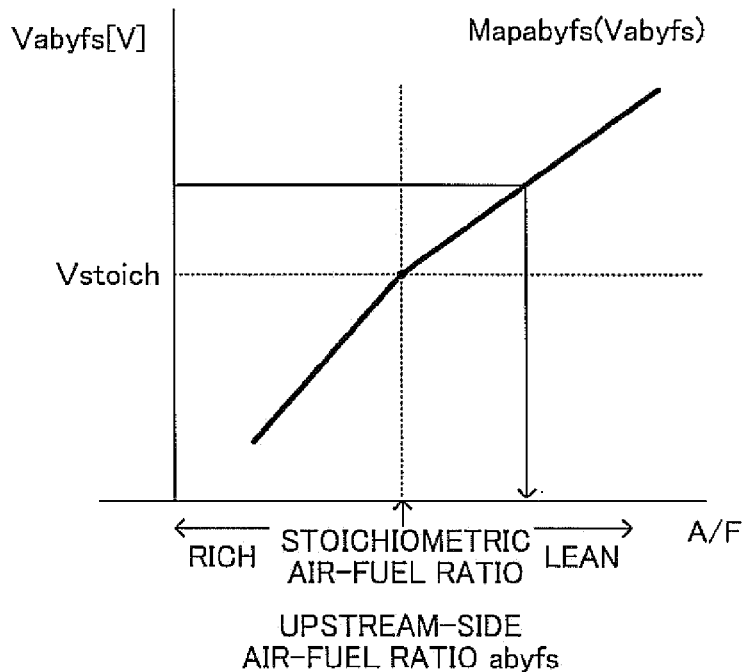
FIG. 6 is a graph showing the relation between an output value and the air-fuel ratio of the exhaust gas in the upstream-side air-fuel ratio sensor illustrated in FIG. 2.

As shown in FIG. 6, the upstream-side air-fuel ratio sensor 55 operating based on the detection principle as described above outputs the output value Vabyfs in accordance with the air-fuel ratio (upstream-side air-fuel ratio "abyfs") of the exhaust gas flowing through the position at which the upstream-side air-fuel ratio sensor 55 is provided. The output value Vabyfs is obtained by converting the limiting current Ip into a voltage. The output value Vabyfs increases as the air-fuel ratio of the detected gas increases (shifts toward the lean side).

The electric controller 60 memorizes (stores) an air-fuel ratio conversion table (map) Mapabyfs shown in FIG. 6 and applies the output value Vabyfs to the air-fuel ratio conversion table Mapabyfs to detect an actual upstream-side air-fuel ratio "abyfs". The air-fuel ratio conversion table Mapabyfs is created in view of the selective diffusion of hydrogen. In other words, the air-fuel ratio conversion table Mapabyfs is created based on the actual output value Vabyfs of the upstream-side air-fuel ratio sensor 55 on the basis that the air-fuel ratios of the cylinders 21 are set to the same air-fuel ratio x and then the air-fuel ratio of the exhaust gas reaching the upstream-side air-fuel ratio sensor 55 is set to the value x.

Figure 7:
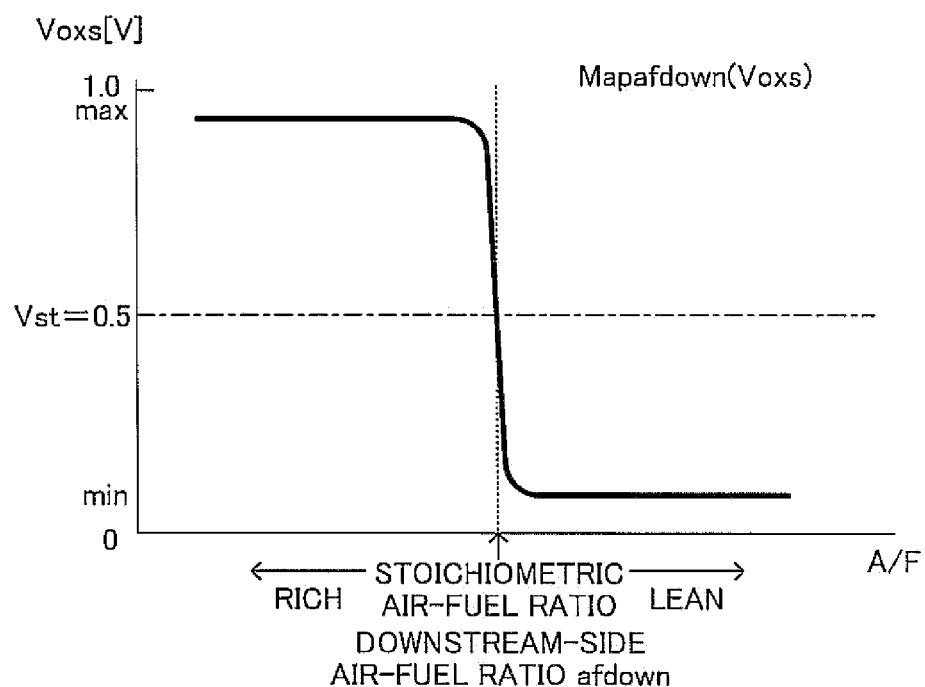
FIG. 7 is a graph showing the relation between an output value and the air-fuel ratio of the exhaust gas in a downstream-side air-fuel ratio sensor illustrated in FIG. 1.

As shown in FIG. 7, an output value Voxs of the downstream-side air-fuel ratio sensor 56 becomes a maximum output value "max" (about 0.9 V, for example) when the air-fuel ratio of the detected gas corresponding to the exhaust gas having passed through the upstream-side catalyst 43 is on the rich side of the stoichiometric air-fuel ratio, becomes a minimum output value "min" (about 0.1 V, for example) when the air-fuel ratio of the detected gas is on the lean side of the stoichiometric air-fuel ratio, and becomes a voltage Vst (intermediate voltage Vst, for example, about 0.5 V) approximately in the middle between the maximum output value "max" and the minimum output value "min" when the air-fuel ratio of the detected gas is the stoichiometric air-fuel ratio. The output value Voxs abruptly changes from the maximum output value "max" to the minimum output value "min" when the air-fuel ratio of the detected gas changes from the air-fuel ratio on the rich side of the stoichiometric air-fuel ratio to the air-fuel ratio on the lean side of the stoichiometric air-fuel ratio, and abruptly changes from the minimum output value "min" to the maximum output value "max" when the air-fuel ratio of the detected gas changes from the air-fuel ratio on the lean side of the stoichiometric air-fuel ratio to the air-fuel ratio on the rich side of the stoichiometric air-fuel ratio.

5. Principle of Imbalance Abnormality Determination

Next, the principle of the imbalance abnormality determination by the electric controller 60 of this embodiment is described. The "imbalance abnormality" is an abnormality in which imbalance of the air-fuel ratios among the plurality of cylinders 21 (hereinafter, referred to simply as "air-fuel ratio imbalance") becomes equal to or larger than a value for which a warning is required to be issued (specifically, reaches the degree which cannot be permitted in terms of emission).

A fuel of the engine 2 is a compound of carbon and hydrogen. Therefore, in the process in which the fuel combusts to change into water $H_2O$ and carbon dioxide $CO_2$, intermediates (unburned substances) such as hydrocarbon HC, carbon monoxide CO, and hydrogen $H_2$ are produced.

Figure 8:
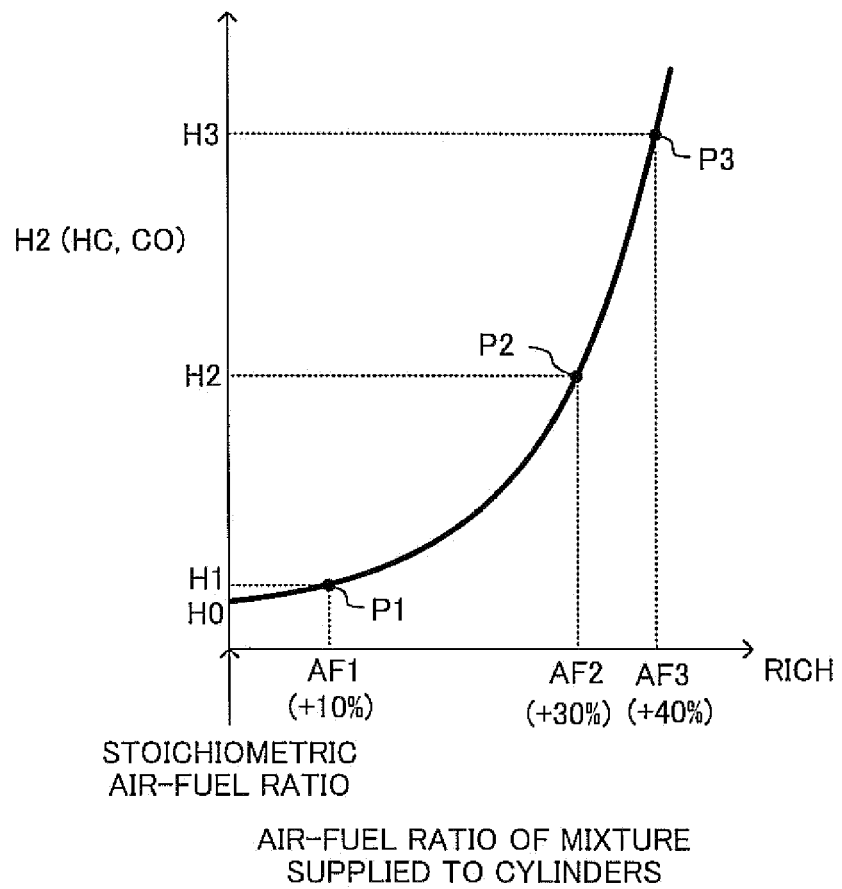
FIG. 8 is a graph showing the relation between an air-fuel ratio of an air-fuel mixture supplied to cylinders and unburned components exhausted from the cylinders.

As the air-fuel ratio of the mixture supplied for the combustion becomes smaller than the stoichiometric air-fuel ratio (specifically, shifts toward the rich side), a difference between the amount of oxygen required for complete combustion of the fuel and an actual amount of oxygen becomes larger. In other words, as the air-fuel ratio shifts toward the rich side, the amount of insufficient oxygen during the combustion increases to lower the oxygen concentration. Therefore, as the air-fuel ratio shifts toward the rich side, a probability of encounter and coupling of the above-mentioned intermediates (unburned substances) to oxygen (oxidation of the intermediates) abruptly becomes small. As a result, as shown in FIG. 8, the amount of unburned substances (HC, CO, and $H_2$) exhausted from the cylinders 21 abruptly (quadratically) increases as the air-fuel ratio of the mixture supplied to the cylinders 21 shifts toward the rich side. Here, points P1, P2, and P3 shown in FIG. 8 are points at which the amount of fuel supplied to a certain one of the cylinders 21 becomes excessive respectively by 10% (=AF1), 30% (=AF2), and 40% (=AF3) with respect to the amount of fuel when the air-fuel ratio of the corresponding cylinder 21 becomes equal to the stoichiometric air-fuel ratio, respectively.

Among the unburned substances exhausted from the cylinders 21, the molecule of hydrogen $H_2$ is smaller than those of hydrocarbon HC and carbon monoxide CO. Therefore, hydrogen $H_2$ rapidly diffuses in the diffusion resistance layer 55d of the upstream-side air-fuel ratio sensor 55 as compared with the other unburned substances (HC and CO). Accordingly, when a large amount of unburned substances including HC, CO, and $H_2$ is produced, the selective diffusion (preferential diffusion) of hydrogen $H_2$ remarkably occurs in the diffusion resistance layer 55d. Specifically, a larger amount of hydrogen $H_2$ reaches the surface of the air-fuel ratio detecting element (exhaust-gas side electrode layer 55b formed on the surface of the solid electrolyte layer 55a) than the amount of the other unburned substances (HC and CO). As a result, the balance between the concentration of hydrogen $H_2$ and the concentration of the other unburned substances (HC and CO) is lost. In other words, a rate of hydrogen $H_2$ with respect to all the unburned components contained in the exhaust gas reaching the air-fuel ratio detecting element (exhaust-gas side electrode layer 55b) of the upstream-side air-fuel ratio sensor 55 becomes larger than that of hydrogen $H_2$ with respect to all the unburned components contained in the exhaust gas exhausted from the engine 2.

In the meantime, as described above, the electric controller 60 corresponding to one embodiment of the present invention is the air-fuel ratio controller. The air-fuel ratio controller performs feedback control (main feedback control) of the air-fuel ratio so that the upstream-side air-fuel ratio "abyfs" (air-fuel ratio corresponding to the output value Vabyfs) indicated by the output value Vabyfs of the upstream-side air-fuel ratio sensor 55 becomes equal to an upstream-side target air-fuel ratio "abyfr". In general, the upstream-side target air-fuel ratio "abyfr" is set to the stoichiometric air-fuel ratio "stoich".

Further, the air-fuel ratio controller performs sub-feedback control of the air-fuel ratio so that the output value Voxs of the downstream-side air-fuel ratio sensor 56 (or the downstream-side air-fuel ratio "afdown" indicated by the output value Voxs of the downstream-side air-fuel ratio sensor) becomes equal to a downstream-side target value Voxsref (or a downstream-side target air-fuel ratio indicated by the downstream-side target value Voxsref). In general, the downstream-side target value Voxsref is set to a value (0.5 V) corresponding to the stoichiometric air-fuel ratio.

First, it is assumed that the air-fuel ratios of the cylinders 21 all uniformly deviate toward the rich side although the air-fuel ratio imbalance has not occurred. More specifically, for example, it is supposed that the air-fuel ratios of the cylinders 21 are AF2 shown in FIG. 8. The state described above is brought about, for example, when a measured value or an estimate of the intake air amount of the engine 2, which is a basic amount for calculating the fuel injection amount becomes larger than a true intake air amount.

When the air-fuel ratio of one of the cylinders 21 is AF2, a larger amount of unburned substance (hydrogen $H_2$) is contained in the exhaust gas as compared with the case where the air-fuel ratio of the corresponding cylinder 21 is equal to the air-fuel ratio AF1 which is closer to the stoichiometric air-fuel ratio than AF2 (see the points P1 and P2). Therefore, the selective diffusion of hydrogen $H_2$ as described above occurs in the diffusion resistance layer 55d of the upstream-side air-fuel ratio sensor 55.

In this case, however, a true average value of the air-fuel ratios of the mixture supplied to the engine 2 while each of the cylinders 21 completes one combustion stroke (interval corresponding to a crank angle of 720 degrees) is also AF2. Further, as described above, the air-fuel ratio conversion table Mapabyfs shown in FIG. 6 is created in view of the selective diffusion of hydrogen $H_2$. Therefore, the upstream-side air-fuel ratio "abyfs" (upstream-side air-fuel ratio "abyfs" obtained by applying the actual output value Vabyfs to the air-fuel ratio conversion table Mapabyfs) indicated by the actual output value Vabyfs of the upstream-side air-fuel ratio sensor 55 is equal to the true average value AF2 of the air-fuel ratios described above.

Thus, the air-fuel ratio of the mixture supplied to the entire engine 2 is corrected so as to become equal to the stoichiometric air-fuel ratio corresponding to the upstream-side target air-fuel ratio "abyfr" by the main feedback control. At this time, as described above, the air-fuel ratio imbalance has not occurred. Therefore, the air-fuel ratio of each of the cylinders 21 is approximately equal to the stoichiometric air-fuel ratio. Thus, the sub-feedback amount (and a learning value of the sub-feedback amount described below) does not become a value for which the air-fuel ratio is required to be greatly corrected. Specifically, if the air-fuel ratio imbalance has not occurred, the sub-feedback amount (and the learning value of the sub-feedback amount described below) does not become a value for which the air-fuel ratio is greatly corrected.

Next, a behavior of each value in case of the air-fuel ratio imbalance is described in comparison with a behavior of each value without the occurrence of the air-fuel ratio imbalance as described above.

Here, it is assumed that, when the air amount (weight) sucked into each of the cylinders 21 of the engine 2 is A0 and the fuel amount (weight) supplied to each of the cylinders 21 is F0, the air-fuel ratio A0/F0 is equal to the stoichiometric air-fuel ratio (for example, 14.5).

First, it is assumed that the fuel amounts supplied (injected) respectively to the cylinders 21 become uniformly excessive by 10% due to an estimate error of the intake air amount although the air-fuel ratio imbalance has not occurred. Specifically, it is assumed that a fuel of 1.1×F0 is supplied to each of the cylinders 21.

At this time, a total amount of air supplied to the four-cylinder engine 2 (the air amount supplied to the entire engine 2 while each of the cylinders 21 completes one combustion stroke) is 4×A0. Also, a total amount of fuel supplied to the engine 2 (the fuel amount supplied to the entire engine 2 while each of the cylinders 2 completes one combustion stroke) is 4.4×F0 (=1.1×F0+1.1×F0+1.1×F0+1.1×F0). Therefore, a true average value of the air-fuel ratios of the mixture supplied to the entire engine 2 is 4×A0/(4.4×F0)=A0/(1.1×F0). At this time, the output value of the upstream-side air-fuel ratio sensor 55 becomes an output value in accordance with the air-fuel ratio A0/(1.1×F0).

Then, the fuel amounts supplied to the respective cylinders 21 are reduced by 10% by the main feedback control (fuel amount F0 is supplied to the respective cylinders 21). Therefore, the air-fuel ratio of the mixture supplied to the entire engine 2 is made equal to the stoichiometric air-fuel ratio A0/F0.

On the other hand, it is assumed that the case where only the air-fuel ratio of a specific one of the cylinders 21 greatly shifts toward the rich side to bring about the air-fuel ratio imbalance. This state is brought about when, for example, an injection characteristic of the injector 25 provided so as to correspond to the specific cylinder 21 becomes a characteristic in which a remarkably larger amount of fuel than an instructed fuel injection amount is injected. Such an abnormality of the injector 25 is also referred to as "rich deviation abnormality" of the fuel injection valve.

More specifically, it is assumed that the amount of fuel supplied to one certain cylinder 21 (hereinafter, referred to as "specific cylinder") is excessive by 40% (that is, 1.4×F0) and the amount of fuel supplied to each of the remaining three cylinders 21 is such fuel amount that the air-fuel ratio of each of the cylinders 21 is equal to the stoichiometric air-fuel ratio (that is, the fuel amount F0). In this case, the air-fuel ratio of the specific cylinder is AF3 shown in FIG. 8, whereas the air-fuel ratio of each of the remaining cylinders 21 is the stoichiometric air-fuel ratio.

At this time, the total amount of air supplied to the four-cylinder engine 2 is 4×A0. On the other hand, the total amount of fuel supplied to the engine 2 is 4.4×F0 (=1.4×F0+F0+F+F0). Therefore, the true average value of the air-fuel ratios of the mixture supplied to the entire engine 2 is 4×A0/(4.4×F0)= A0/(1.1×F0). Specifically, the true average value of the air-fuel ratios of the mixture supplied to the entire engine 2 in this case becomes the same value as that in the case where the fuel amounts supplied to the respective cylinders 21 are uniformly excessive by 10%.

As described above, however, the amount of unburned substances (HC, CO, and $H_2$) contained in the exhaust gas more rapidly increases as the air-fuel ratio of the mixture supplied to the cylinders 21 shifts toward the rich side.

Therefore, when only the amount of fuel supplied to the specific cylinder becomes excessive by 40%, a total amount SH1 of hydrogen $H_2$ contained in the exhaust gas is: SH1=H3+H0+H0+H0=H3+3×H0 according to FIG. 8. On the other hand, a total amount SH2 of hydrogen $H_2$ contained in the exhaust gas when the fuel amounts supplied to the respective cylinders 21 are uniformly excessive by 10% is: SH2=H1+H1+H1+H1=4×H1 according to FIG. 8. Although the amount H1 is slightly larger than the amount H0, the amounts H1 and H0 are both extremely small. Specifically, it can be said that the amounts H1 and H0 are approximately equal to each other in comparison with the amount H3. Therefore, the total hydrogen amount SH1 is remarkably larger than the total hydrogen amount SH2 (SH1>>SH2).

As described above, even if the true average value of the air-fuel ratios of the mixture supplied to the entire engine 2 is the same, the total amount SH1 of hydrogen contained in the exhaust gas when the air-fuel ratio imbalance occurs becomes remarkably larger than the total amount SH2 of hydrogen contained in the exhaust gas when the air-fuel ratio imbalance does not occur.

Thus, when only the amount of fuel supplied to the specific cylinder becomes excessive by 40%, the air-fuel ratio represented by the output value Vabyfs of the upstream-side air-fuel ratio sensor 55 becomes smaller than, or on the rich side of, the true average value (A0/(1.1×F0)) of the air-fuel ratios of the mixture supplied to the entire engine 2 due to the selective diffusion of hydrogen $H_2$ in the diffusion resistance layer 55d described above. Specifically, even if the average value of the air-fuel ratios of the exhaust gas is the same, the concentration of hydrogen $H_2$ in the exhaust-gas side electrode layer 55b of the upstream-side air-fuel ratio sensor 55 becomes higher in the case where the air-fuel ratio imbalance occurs than in the case where the air-fuel ratio imbalance does not occur. Therefore, the output value Vabyfs of the upstream-side air-fuel ratio sensor 55 is a value on the rich side of the true average value of the air-fuel ratios. As a result, the true average value of the air-fuel ratios of the mixture supplied to the entire engine 2 is controlled to be on the lean side of the stoichiometric air-fuel ratio by the main feedback control.

On the other hand, the exhaust gas having passed through the upstream-side catalyst 43 reaches the downstream-side air-fuel ratio sensor 56. Hydrogen $H_2$ contained in the exhaust gas is oxidized (purified) in the upstream-side catalyst 43 together with the other unburned substances (HC and CO). Therefore, the output value Voxs of the downstream-side air-fuel ratio sensor 56 becomes a value in accordance with the true air-fuel ratio of the mixture supplied to the entire engine 2. Therefore, the control amount (sub-feedback amount and the like) for the air-fuel ratio, calculated in the sub-feedback control, is for compensating for excessive correction of the air-fuel ratio toward the lean side by the main feedback control described above. By the sub-feedback amount or the like, the true average value of the air-fuel ratios of the engine 2 is made equal to the stoichiometric air-fuel ratio.

As described above, the control amount (sub-feedback amount) for the air-fuel ratio, calculated in the sub-feedback control, is a value for compensating for excessive correction of the air-fuel ratio toward the lean side due to the air-fuel ratio imbalance caused by the rich deviation abnormality of the injector 25. Moreover, the degree of excessive correction toward the lean side increases as the amount of fuel injected by the injector 25 causing the rich deviation abnormality becomes larger (specifically, as the air-fuel ratio of the specific cylinder shifts toward the rich side) as compared with the instructed injection amount.

Therefore, in the system for correcting the air-fuel ratio of the engine toward the rich side as the magnitude of the sub-feedback amount becomes larger when the sub-feedback amount is a positive value, the value changing in accordance with the sub-feedback amount (in practice, for example, the sub-feedback learning value which is the amount corresponding to the steady component of the sub-feedback amount) is a value indicating the degree of air-fuel ratio imbalance.

Based on the knowledge described above, the controller (device) of this embodiment acquires the value changing in accordance with the sub-feedback amount ("sub-FB learning value" corresponding to the learning value of the sub-feedback amount in this embodiment) as a parameter for imbalance determination. The parameter for imbalance determination has a larger value as a difference between the amount of hydrogen contained in the exhaust gas before passing through the upstream-side catalyst 43 and the amount of hydrogen contained in the exhaust gas after passing through the upstream-side catalyst 43 becomes larger. The controller (device) of this embodiment determines the occurrence of the imbalance abnormality when the parameter for imbalance determination becomes equal to or larger than an abnormality determination threshold value.

Figure 9:
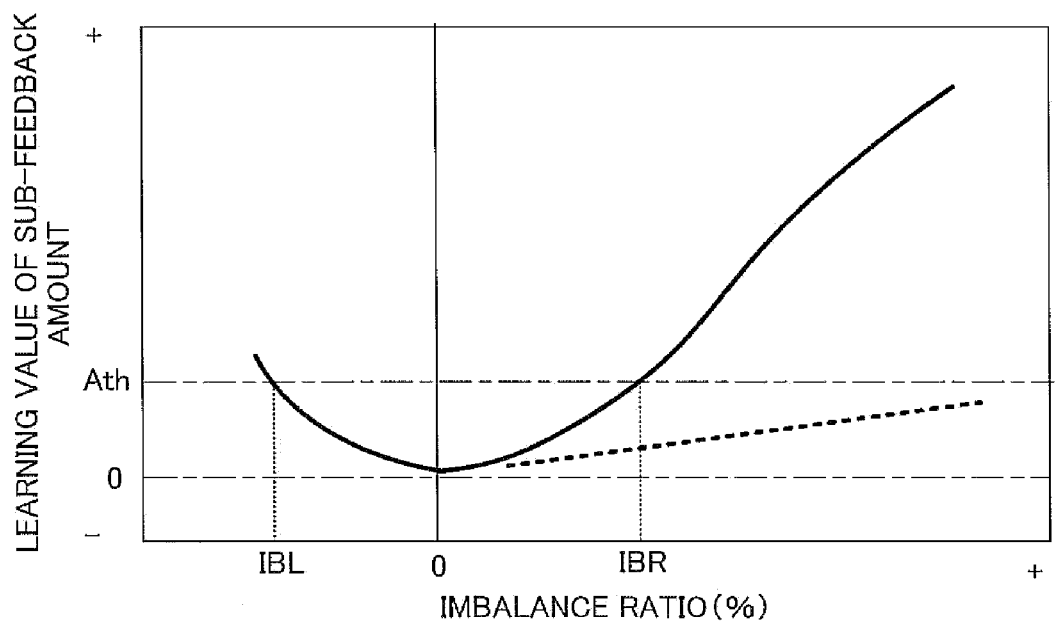
FIG. 9 is a graph showing the relation between an imbalance ratio and a learning value of a sub-feedback amount.

A solid line of FIG. 9 indicates the sub-FB learning value obtained when the air-fuel ratio of one of the cylinders 21 diverges from the stoichiometric air-fuel ratio to the rich side and the lean side due to the occurrence of the air-fuel ratio imbalance. A horizontal axis of the graph of FIG. 9 indicates an "imbalance ratio". The "imbalance ratio" is a ratio (Y/X) of a difference Y(=X−af) between the stoichiometric air-fuel ratio X and the air-fuel ratio "af" of the cylinder 21, which deviates toward the rich side from the stoichiometric air-fuel ratio X, to the stoichiometric air-fuel ratio X. As described above, as the imbalance ratio becomes larger, the effects of selective diffusion of hydrogen $H_2$ abruptly become large. Therefore, as indicated by the solid line of FIG. 9, the sub-FB learning value (and therefore, the parameter for imbalance determination) quadratically increases in accordance with an increase in imbalance ratio.

As indicated by the solid line of FIG. 9, even when the imbalance ratio is a negative value, the sub-FB learning value increases as the absolute value of the imbalance ratio increases. Specifically, for example, even when the air-fuel ratio imbalance in which only the air-fuel ratio of one specific cylinder greatly deviates toward the lean side occurs, the sub-FB learning value (or the value in accordance with the sub-FB learning value) serving as the parameter for imbalance determination increases. The above-mentioned condition occurs when, for example, the injection characteristic of the injector 25 provided to the specific cylinder 21 becomes a characteristic for injecting a significantly smaller amount of fuel than the instructed fuel injection amount. The abnormality of the injector 25 described above is also referred to as a lean deviation abnormality of the fuel injection valve.

Therefore, the controller (device) of this embodiment determines the occurrence of the imbalance abnormality when the parameter for imbalance determination becomes equal to or larger than an abnormality criterion threshold value Ath not only in the case where the air-fuel ratio of the specific cylinder shifts toward the rich side but also in the case where the air-fuel ratio of the specific cylinder shifts toward the lean side.

A broken line of FIG. 9 indicates the sub-FB learning value obtained in the case where the air-fuel ratios of the respectively cylinders 21 are uniformly deviated from the stoichiometric air-fuel ratio toward the rich side and the main feedback control is interrupted. The scales in the horizontal-axis direction for the broken line of FIG. 9 are adjusted so as to correspond to a shift of the air-fuel ratio of the engine 2 in case of the air-fuel ratio imbalance. Specifically, for example, when the air-fuel ratio imbalance, in which only the first cylinder shifts toward the rich side by 20%, occurs, the imbalance ratio is 20%. On the other hand, when the air-fuel ratios of the cylinders 21 are uniformly shifted by 5% (20%/four cylinders), the imbalance ratio is treated as corresponding to 20% in FIG. 9 although the actual imbalance ratio is 0%. In comparison between the sold line and the broken line of FIG. 9, it is understood that the occurrence of the imbalance abnormality can be determined when the sub-FB learning value becomes equal to or larger than the abnormality criterion threshold value Ath. In practice, the main feedback control is performed. Therefore, the sub-FB learning value does not increase as largely as indicated by the broken line of FIG. 9 when the air-fuel ratio imbalance does not occur.

6. Description of Specific Operation Example

Next, an example of actual operation of the controller (device) of this embodiment is described. Hereinafter, for convenience of description, "MapX (a1, a2, . . . )" is described as a table for obtaining a value X with a1, a2, . . . as an argument. When a value of the argument is a detection value of the sensor, a current value is used. Further, "status N" is described as representing a state in which "status" is set to "N" (N=0, 1, or 2). Here, "status" indicates the degree of progress of learning of the sub-FB learning value Vafsfbg (time integral value SDVoxs) described below, that is, the degree of a fluctuating state of the sub-FB learning value Vafsfbg.

(6-1. Fuel Injection Amount Control)

Figure 10:
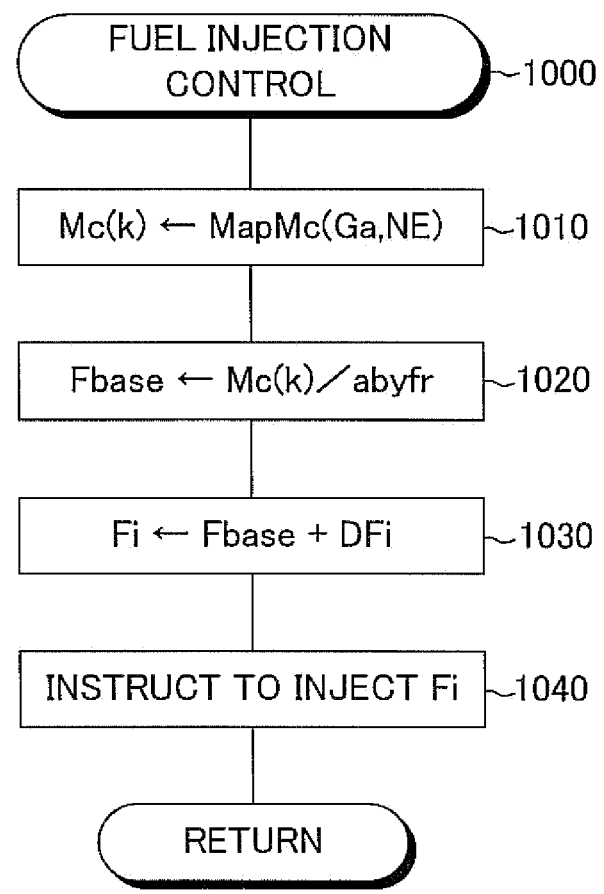
FIG. 10 is a flowchart illustrating a specific example of a fuel injection control routine executed by a CPU of an electric controller illustrated in FIG. 1.

The CPU included in the electric controller 60 (hereinafter, referred to simply as "CPU") repeatedly executes a routine 1000 illustrated in FIG. 10, for calculating a fuel injection amount Fi and issuing a fuel injection instruction at each predetermined timing. The "predetermined timing" in this example is at timing at which the crank angle of a predetermined one of the cylinders 21 (hereinafter, the predetermined cylinder is also referred to as "fuel injection cylinder") becomes equal to a predetermined crank angle before an intake top dead center (for example, BTDC 90° CA). Therefore, at the predetermined timing, the CPU sequentially executes Steps 1010 to 1040. Then, the CPU terminates the routine.

Step 1010: The engine rotation speed NE and the intake air amount Ga measured by the airflow meter 51 are applied to a table MapMc(Ga, NE) to acquire an in-cylinder intake air amount Mc(k). The in-cylinder intake air amount Mc(k) is the amount corresponding to an air amount taken into the fuel injection cylinder. The acquired in-cylinder intake air amount Mc(k) is stored in a RAM in a manner corresponding to each intake stroke.

Step 1020: The in-cylinder intake air amount Mc(k) is divided by the upstream-side target air-fuel ratio "abyfr" to obtain a basic fuel injection amount Fbase. Except for special cases described below, the upstream-side target air-fuel ratio "abyfr" is set to the stoichiometric air-fuel ratio "stoich".

Step 1030: The basic fuel injection amount Fbase is corrected with a main feedback amount DFi (more specifically, the main feedback amount DFi is added to the basic fuel injection amount Fbase) to calculate a final fuel injection amount Fi. The main feedback amount Dfi is described below.

Step 1040: An instruction signal corresponding to the final fuel injection amount Fi calculated in Step 1030 described above is transmitted to the injector 25 provided so as to correspond to the fuel injection cylinder. The instruction signal is generated so that the final fuel injection amount (instructed injection amount) Fi of fuel is injected from the injector 25 provided so as to correspond to the fuel injection cylinder.

In the above-mentioned manner, the amounts of fuel injected from the respective injectors 25 are uniformly increased or reduced by the main feedback amount DFi common to all the cylinders 21.

The CPU also performs a fuel-cut operation (hereinafter, also referred to as "FC control"). The FC control is control for stopping fuel injection. The FC control is started when the following fuel-cut start conditions are satisfied and is terminated when the following fuel-cut recovery (end) conditions are satisfied. Then, from the time at which the fuel-cut start conditions are satisfied to the time at which the fuel-cut recovery conditions are satisfied, the fuel injection is stopped. Specifically, the value of the final fuel injection amount Fi in Step 1030 illustrated in FIG. 10 is set to "0".

Fuel-Cut Start Conditions

The throttle-valve opening degree TA is "0" (or the accelerator-pedal operation amount Accp is "0"), and the engine rotation speed NE is equal to or higher than a fuel-cut start rotation speed NEFCth.

Fuel-Cut Recovery Conditions

The fuel-cut operation is being performed, and the throttle-valve opening degree TA (or the accelerator-pedal operation amount Accp) becomes larger than "0", or the fuel-cut operation is being performed, and the engine rotation speed NE becomes equal to or lower than a fuel-cut recovery rotation speed NERTth (NERTth is smaller than the fuel-cut start rotation speed NEFCth).

(6-2. Calculation of Main Feedback Amount)

Figure 11:
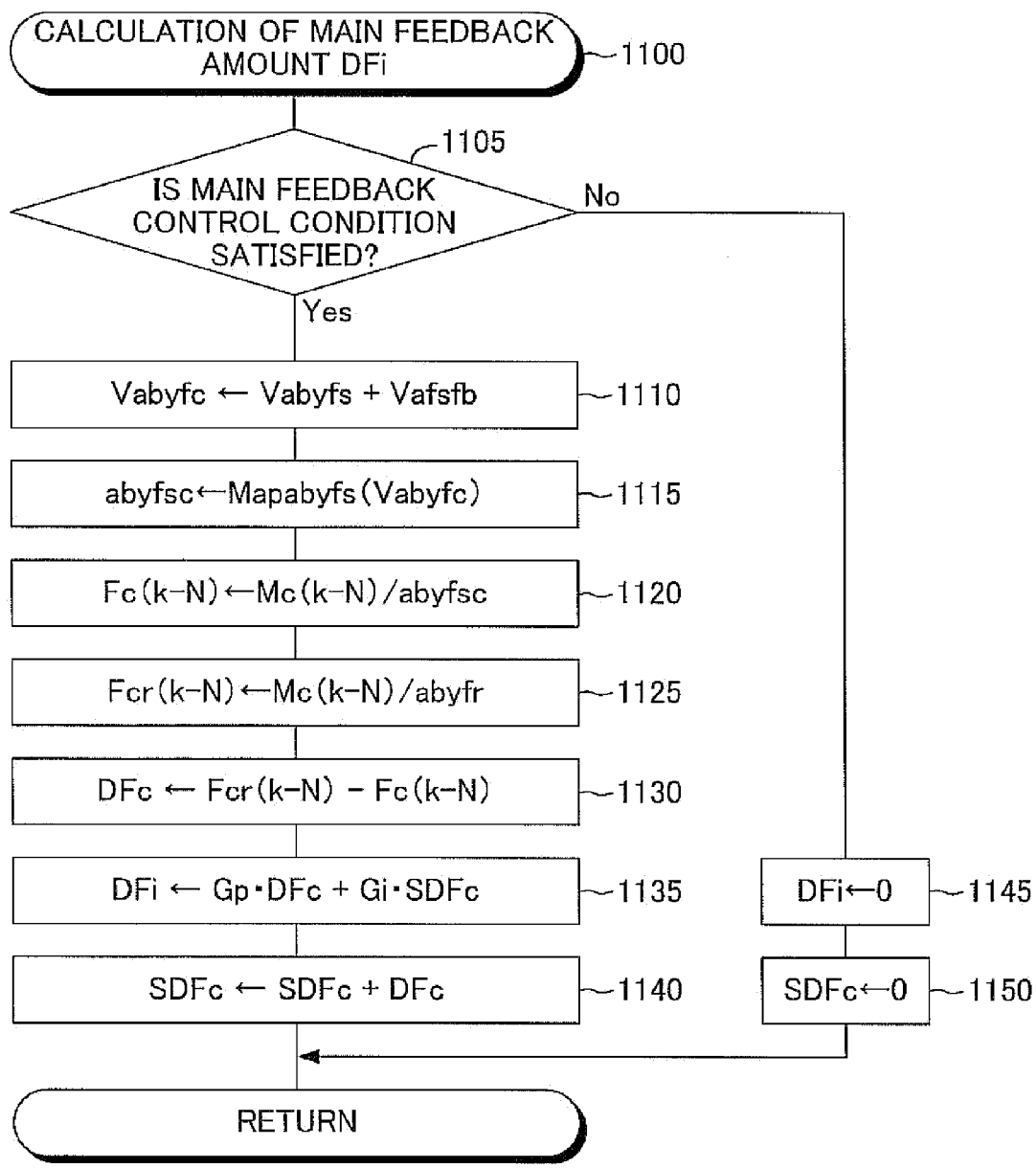
FIG. 11 is a flowchart illustrating a specific example of a routine executed by the CPU of the electric controller illustrated in FIG. 1 so as to calculate a main feedback amount.

The CPU repeatedly executes a main feedback amount calculation routine 1100 illustrated in FIG. 11 when each predetermined time elapses. Therefore, at the predetermined timing, the CPU starts processing in Step 1105 to sequentially execute processing in the respective steps.

In Step 1105, whether or not a main feedback control condition (upstream-side air-fuel ratio feedback control condition) is satisfied is determined.

The main feedback control condition is satisfied when, for example, all the following conditions are satisfied.

(A1) The upstream-side air-fuel ratio sensor 55 is activated.

(A2) A load (load factor) KL of the engine is equal to or smaller than a threshold value KLth.

(A3) Fuel-cut control is not currently performed.

The load factor KL is obtained by the following Equation (1). In Equation (1), Mc(k) is the in-cylinder intake air amount, $\rho$ is an air density (in (g/l)), L is the displacement of the engine 2 (in (l)), and "4" is the number of the cylinders 21 of the engine 2.

$$KL=(Mc(k)/(\rho \times L/4))\times 100\% \qquad (1)$$

The description is continued assuming that the main feedback control condition is now satisfied (Step 1105=Yes). Then, the processing proceeds from Step 1105 to the subsequent Steps 1110 to 1140. After the termination of Step 1140, this routine is terminated.

Step 1110: An output value Vabyfc for feedback control is obtained in accordance with the following Equation (2). In Equation (2), Vabyfs is the output value of the upstream-side air-fuel ratio sensor 55, and Vafsfb is the sub-feedback amount calculated based on the output value Voxs of the downstream-side air-fuel ratio sensor 56. The above-mentioned values are both values obtained at the current time. A method of calculating the sub-feedback amount Vafsfb is described below.

$$Vabyfc = Vabyfs + Vafsfb \quad (2)$$

Step 1115: As expressed by the following Equation (3), the above-mentioned output value Vabyfc for feedback control is applied to the air-fuel ratio conversion table Mapabyfs shown in FIG. 6 to obtain an air-fuel ratio "abyfsc" for feedback control.

$$abyfsc = Mapabyfs(Vabyfc) \quad (3)$$

Step 1120: An in-cylinder fuel supply amount Fc(k−N) is obtained in accordance with the following Equation (4). The in-cylinder fuel supply amount Fc(k−N) is the amount of fuel actually supplied to the combustion chambers (cylinders) 21 at the time N cycles before the current time. Specifically, an in-cylinder intake air amount Mc(k−N) at the time N cycles (specifically, N×720° crank angle) before the current time is divided by the air-fuel ratio "abyfsc" for feedback control to obtain the in-cylinder fuel supply amount Fc(k−N).

$$F(k-N) = Mc(k-N)/abyfsc \quad (4)$$

The reason why the in-cylinder intake air amount Mc(k−N) at the time N strokes before the current time is divided by the air-fuel ratio "abyfsc" for feedback control to obtain the in-cylinder fuel supply amount Fc(k−N) is as follows. It takes time corresponding to N strokes for the exhaust gas generated by the combustion of the mixture in the combustion chambers 21 to reach the upstream-side air-fuel ratio sensor 55 (in practice, however, the exhaust gas reaches the upstream-side air-fuel ratio sensor 55 after the exhaust gases exhausted from the respective cylinders 21 mix together to a certain degree).

Step 1125: A target in-cylinder fuel supply amount Fcr(k−N) is obtained in accordance with the following Equation (5). The target in-cylinder fuel supply amount Fcr(k−N) is the amount of fuel which should be supplied to the combustion chambers (cylinders) 21 at the time N cycles before the current time.

Specifically, by dividing the in-cylinder intake air amount Mc(k−N) at the time N strokes before the current time by the upstream-side target air-fuel ratio "abyfr", the target in-cylinder fuel supply amount Fcr(k−N) is obtained.

$$Fcr = Mc(k-N)/abyfr \quad (5)$$

As described above, the upstream-side target air-fuel ratio "abyfr" is set to the stoichiometric air-fuel ratio "stoich" during the normal operation. On the other hand, for the purpose of preventing the generation of emission smell due to sulfur or the like, the upstream-side target air-fuel ratio "abyfr" is set to an air-fuel ratio on the lean side of the stoichiometric air-fuel ratio when a predetermined lean setting condition is satisfied. Moreover, when any one of the following conditions is satisfied, the upstream-side target air-fuel ratio "abyfr" is sometimes set to an air-fuel ratio on the rich side of the stoichiometric air-fuel ratio.

The current time is within a predetermined period of time after the FC control ends.

The operation is in an operating state in which overheating of the upstream-side catalyst 43 should be prevented (high-load operating state).

Step 1130: An in-cylinder fuel supply amount deviation DFc is obtained in accordance with the following Equation (6). Specifically, the in-cylinder fuel supply amount Fc(k−N) is subtracted from the target in-cylinder fuel supply amount Fcr(k−N) to obtain the in-cylinder fuel supply amount deviation DFc. The in-cylinder fuel supply amount deviation DFc indicates an excessive/deficient amount of the fuel supplied to the cylinder at the time N strokes before the current time.

$$DFc = Fcr(k-N) - Fc(k-N) \quad (6)$$

Step 1135: The main feedback amount DFi is obtained in accordance with the following Equation (7). In Equation (7), Gp is a preset proportional gain, and Gi is a preset integral gain. Further, a value SDFc in Equation (7) is an integral value (time integral value) of the in-cylinder fuel supply amount deviation DFc. Specifically, proportional-integral control for making the air-fuel ratio "abyfsc" for feedback control to be equal to the upstream-side target air-fuel ratio "abyfr" is performed to calculate the main feedback amount DFi.

$$DFi = Gp \times DFc + Gi \times SDFc \quad (7)$$

Step 1140: The in-cylinder fuel supply amount deviation DFc obtained in Step 1130 is added to the integral value SDFc of the in-cylinder fuel supply amount deviation DFc at the time to obtain a new integral value SDFc of the in-cylinder fuel supply amount deviation.

In the manner described above, the main feedback amount DFi is obtained by the proportional-integral control. The main feedback amount DFi is reflected in the final fuel injection amount Fi by the processing in Step 1030 of FIG. 10 described above.

In the meantime, the sub-feedback amount Vafsfb of the right side of Equation (2) described above is a small value in comparison with the output value Vabyfs of the upstream-side air-fuel ratio sensor 55 and is limited so as to be a small value. Therefore, the sub-feedback amount Vafsfb can be considered as an auxiliary correction amount for making Voxs (output value of the downstream-side air-fuel sensor 56) equal to the down-stream side target value Voxsref (value corresponding to the stoichiometric air-fuel ratio). As a result, it can be said that the air-fuel ratio "abyfsc" for feedback control is a value substantially based on the output value Vabyfs of the upstream-side air-fuel ratio sensor 55. Specifically, it can be said that the main feedback amount DFi is a correction amount for making the air-fuel ratio of the engine, which is indicated by the output value Vabyfs of the upstream-side air-fuel ratio sensor 55, equal to the upstream-side target air-fuel ratio "abyfr" (stoichiometric air-fuel ratio).

On the other hand, when the main feedback control condition is not satisfied at the time of determination in Step 1105 (Step 1105=No), the processing proceeds from Step 1105 to Step 1145 where the value of the main feedback amount DFi is set to "0". Next, in Step 1150, "0" is stored as the integral value SDFc of the in-cylinder fuel supply amount deviation. Then, this routine is terminated. In the manner described above, when the main feedback control condition is not satisfied, the main feedback amount DFi is set to "0". Therefore, the basic fuel injection amount Fbase is not corrected with the main feedback amount DFi.

(6-3. Calculation of Sub-Feedback Amount and Sub-FB Learning Value)

Figure 12:
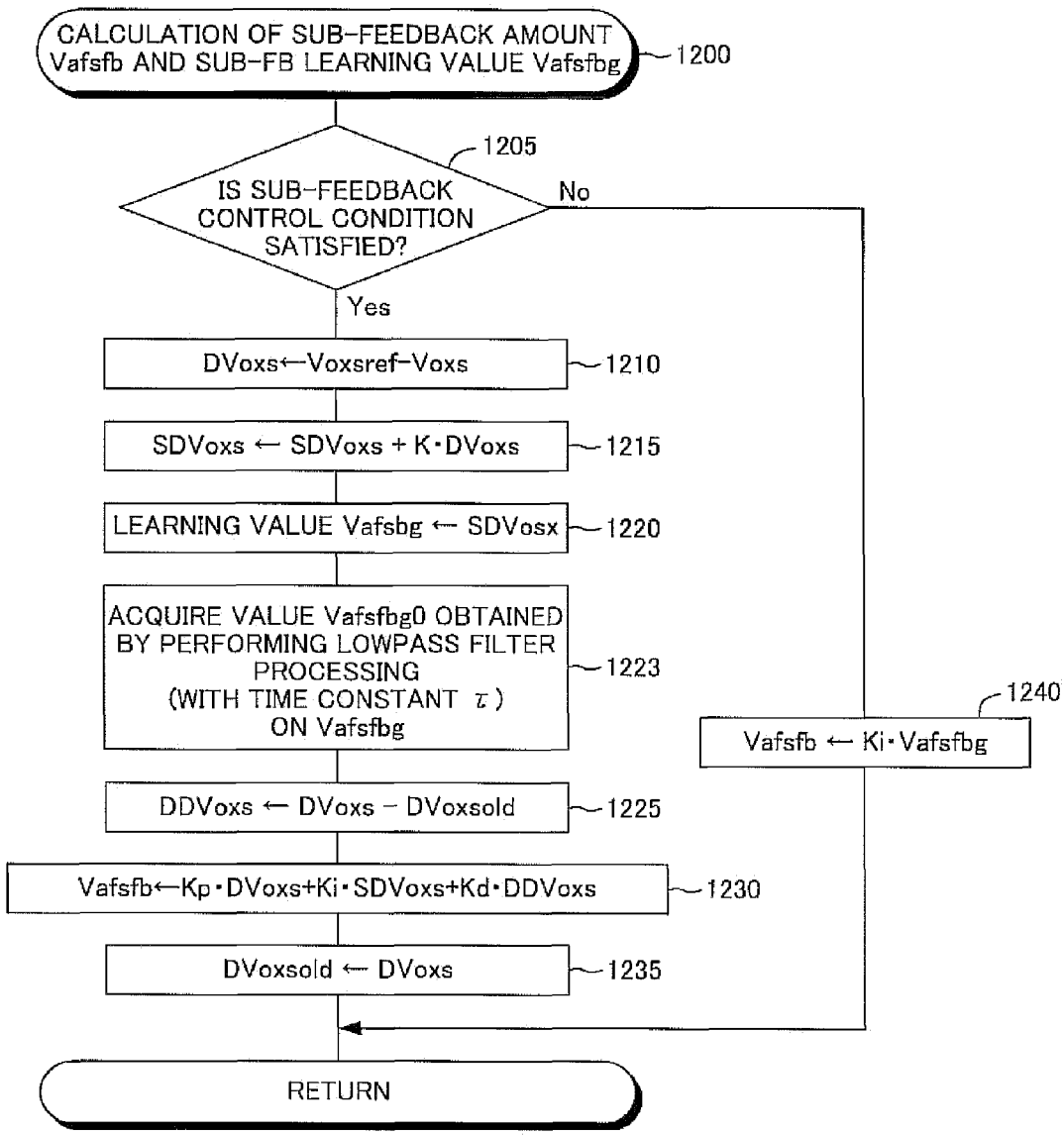
FIG. 12 is a flowchart illustrating a specific example of a routine executed by the CPU of the electric controller illustrated in FIG. 1 so as to calculate a sub-feedback amount and a sub-feedback learning amount.

The CPU repeatedly executes a routine 1200 illustrated in FIG. 12 when each predetermined time elapses so as to calculate the sub-feedback amount Vafsfb and the learning value of the sub-feedback amount Vafsfb (sub-FB learning value Vafsfbg). Therefore, at the predetermined timing, the CPU starts processing in Step 1205 to sequentially execute processing in the respective steps.

In Step 1205, whether or not a sub-feedback control condition is satisfied is determined. The sub-feedback control condition is satisfied when all the following conditions are satisfied. In this example, the sub-feedback control condition is the same as a learning condition of the sub-feedback amount.

(B1) The main feedback control condition is satisfied.
(B2) The downstream-side air-fuel ratio sensor 56 is activated.
(B3) The upstream-side target air-fuel ratio "abyfr" is set to the stoichiometric air-fuel ratio "stoich".
(B4) A time period corresponding to a predetermined update inhibiting frequency L has elapsed immediately after the termination of the fuel-cut (FC) control. The update inhibiting frequency L is described below.

The description is continued assuming that the sub-feedback control condition is satisfied (Step 1205=Yes). Then, the processing proceeds to Steps 1210 to 1235. After the termination of Step 1235, this routine is terminated.

Step 1210: An output deviation amount DVoxs corresponding to a difference between the output value Voxs of the downstream-side air-fuel ratio sensor 56 and the downstream-side target value Voxsref is obtained in accordance with the following Equation (8). Specifically, the output value Voxs of the downstream-side air-fuel sensor 56 at the current time is subtracted from the downstream-side target value Voxsref to obtain the output deviation amount DVoxs. The downstream-side target value Voxref is set to the value Vst (0.5 V) corresponding to the stoichiometric air-fuel ratio.

$$DVoxs = Voxsref - Voxs \quad (8)$$

Step 1215: The time integral value SDVoxs (integral value SDVoxs of the output deviation amount) to be used in Equation (10) described below is updated based on the following Equation (9). Specifically, the CPU adds a product value K×DVoxs of the output deviation amount DVoxs obtained in Step 1210 and a value K to the time integral value SDVoxs at the time, which is stored in the backup RAM as the sub-FB learning value Vafsfbg described below, to obtain a new time integral value SDVoxs.

$$SDVoxs = SDVoxs + K \times DVoxs \quad (9)$$

In Equation (9) given above, K is an adjustment value which defines an update speed of the sub-FD learning value Vafsfbg and is a value set and changed in accordance with the fluctuating state ("status" described below) of the sub-FB learning value Vafsfbg, as described below. Specifically, an update amount of the time integral value SDVoxs for one update is the value K×DVoxs obtained by multiplying the output deviation amount DVoxs by the adjustment value K. By setting and changing the adjustment value K, the update amount K×DVoxs of the time integral value SDVoxs per one update is set and changed.

Step 1220: The time integral value SDVoxs obtained in Step 1215 is stored in the backup RAM as the sub-FB learning value Vafsfbg. Specifically, in Steps 1215 and 1220, the learning of the sub-feedback amount Vafsfb is performed.

Figure 13:
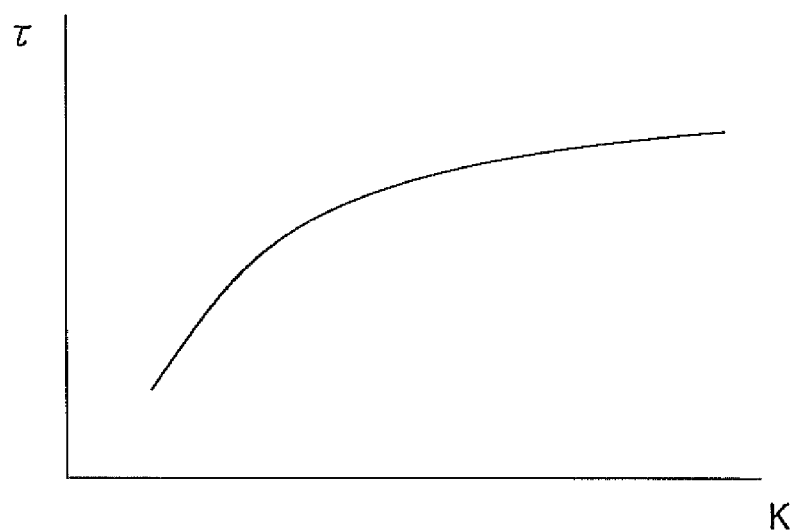
FIG. 13 is a graph illustrating an example of a lookup table to be referred to by the CPU of the electric controller illustrated in FIG. 1 to execute the routine illustrated in FIG. 12.

Step 1223: A value Vafsfbg0 obtained by processing the sub-FB learning value Vafsfbg obtained in Step 1220 with a lowpass filter having a time constant τ is acquired. In this example, the time constant τ of the lowpass filter is determined based on a lookup table (map) shown in FIG. 13 and the adjustment value K. As shown in FIG. 13, the time constant τ of the lowpass filter is a value changed in accordance with the adjustment value K which defines the update speed of the sub-FB learning value Vafsfbg. Specifically, in this example, the time constant τ of the lowpass filter is changed in accordance with the learning speed (update speed of the sub-FB learning value Vafsfbg). More specifically, as shown in FIG. 13, as the learning speed becomes higher, the time constant τ increases.

Step 1225: A previous output deviation amount DVoxsold (output deviation amount calculated when this routine is previously executed) is subtracted from the output deviation amount DVoxs calculated in Step 1210 to obtain a new differential value (time differential value) DDVoxs of the output deviation amount.

Step 1230: The sub-feedback amount Vafsfb is obtained in accordance with the following Equation (10). In Equation (10), Kp is a preset proportional gain (proportional constant), Ki is a preset integral gain (integral constant), and Kd is a preset differential gain (differential constant). Moreover, Kp×DVoxs corresponds to a proportional term, Ki×SDVoxs corresponds to an integral term, and Kd×DDVox corresponds to a differential term. The latest value of the time integral value SDVoxs (specifically, the sub-FB learning value Vafsfbg) stored in the backup RAM is used to obtain the integral term Ki×SDVoxs.

$$Vafsfb = Kp \times DVoxsi + Ki \times SDVoxs + Kd \times DDVoxs \quad (10)$$

Step 1235: The output deviation amount DVoxs calculated in Step 1210 is stored as the previous output deviation amount DVoxsold.

The time integral value SDVoxs converges when the sub-feedback control (specifically, the update of the sub-feedback amount Vafsfb) is stably executed over sufficiently long time. When a convergence value is SDVoxs1, the convergence value SDVoxs1 is a value in accordance with the steady component of the sub-feedback amount and, for example, a value reflecting an air-amount measurement error of the airflow meter 51, an air-fuel ratio detection error of the upstream-side air-fuel ratio sensor 55, and the like.

As described above, the sub-feedback amount Vafsfb is calculated by proportional, integral, differential (PID) control for making the output value Voxs of the downstream-side air-fuel ratio sensor 56 equal to the downstream-side target value Voxsref. The sub-feedback amount Vafsfb is used to calculate the output value Vabyfc for feedback control as expressed in Equation (2).

By the processing described above, the sub-feedback amount Vafsfb and the sub-FB learning value Vafsfbg are updated when each predetermined time elapses.

On the other hand, when the sub-feedback control condition is not satisfied (Step 1205=No), the processing proceeds to Step 1240 where the value of the sub-feedback amount Vafsfb is set to the product of the sub-FB learning value Vafsfbg and the integral gain Ki (Ki×Vafsfbg=Ki×SDVoxs), which is stored in the backup RAM. Then, this routine is terminated.

In the manner described above, the main feedback control and the sub-feedback control are executed.

(6-4. Description of "Status")

Next, the degree of progress of the sub-feedback learning, that is, "status" indicating the fluctuating state of the sub-FB learning value Vafsfbg is described.

A status N(N=0, 1, 2) is defined as follows. Hereinafter, a convergent state of the sub-FB learning value Vafsfbg to the convergence value SDVoxs1 is referred to simply as "convergent state of the sub-FB learning value Vafsfbg".

status 0 ("status" is "0"): The convergent state of the sub-FB learning value is not good. The status 0 means an "unstable state" in which the sub-FB learning value Vafsfbg greatly fluctuates, that is, a state in which the sub-FB learning value Vafsfbg diverges from the convergence value SDVoxs1 and a changing speed of the sub-FB learning value Vafsfbg is high.

status 2 ("status" is "2"): The convergent state of the sub-FB learning value is good. The status 2 means a "stable state", that is, a state in which the sub-FB learning value Vafsfbg is stable in the vicinity of the convergence value SDVoxs1.

status 1 ("status" is "1"): The convergent state of the sub-FB learning value Vafsfbg is an "intermediate state", that is, between the "stable state" and the "unstable state" described above.

(6-5. Setting of Adjustment Value K and Update Inhibiting Frequency L)

Subsequently, an operation of setting the adjustment value K and the update inhibiting frequency L (values for defining the update speed of the sub-FB learning value Vafsfbg, that is, the learning speed) is described. The update inhibiting frequency L is the number of times of inhibition of update of the time integral value SDVoxs in Step 1215 illustrated in FIG. 12 from the time at which the FC control is terminated. The update inhibiting time L is set to a value larger than a fuel injection frequency corresponding to a time period in which rich control after FC is executed. Herein, the "rich control after FC" is control for setting the upstream-side target air-fuel ratio "abyfr" to a value smaller than, or to the rich side of, the stoichiometric air-fuel ratio "stoich" over a predetermined period of time from the time at which the FC control is terminated.

Figure 14:
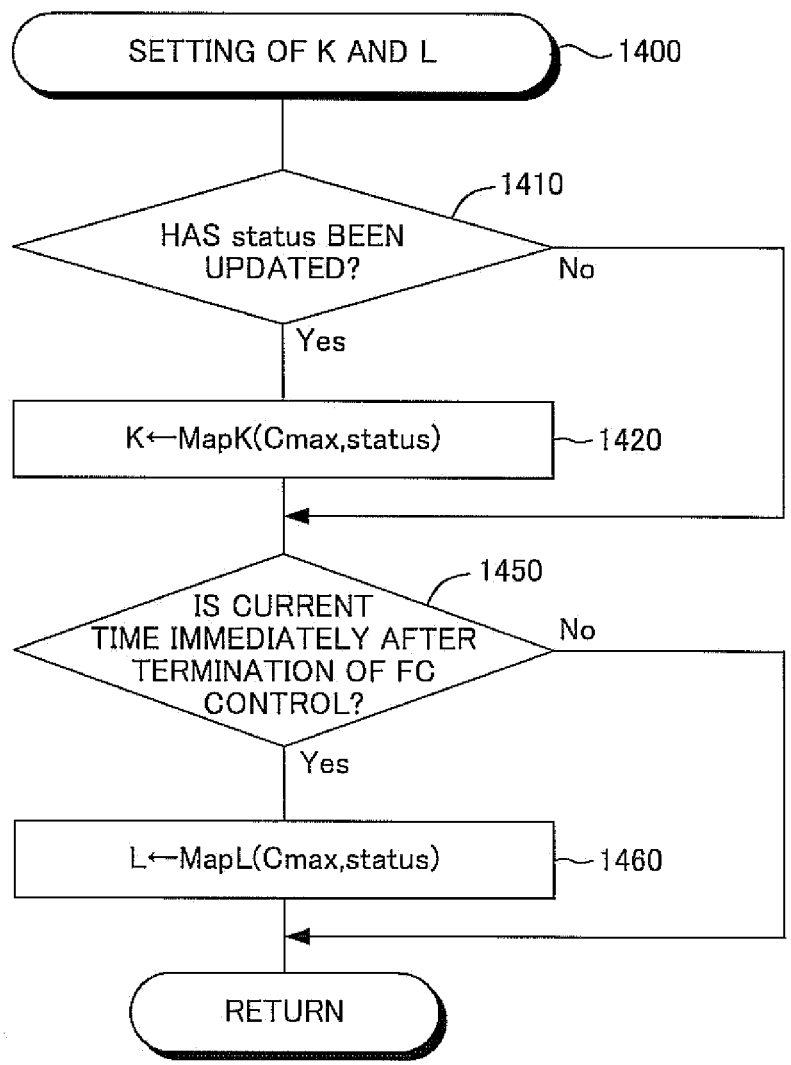
FIG. 14 is a flowchart illustrating a specific example of a routine executed by the CPU of the electric controller illustrated in FIG. 1 so as to set an adjustment value and an update inhibition frequency (corresponding to values for defining the update speed of the sub-feedback learning value, that is, a learning speed)

The CPU repeatedly executes a routine 1400 illustrated in FIG. 14 to set the adjustment value K and the update inhibiting frequency L at timing at which each predetermined time elapses or at each timing of start of the fuel injection for the cylinder 21 which starts the intake stroke after the time of start of the engine 2.

Therefore, at the predetermined timing after the time of start of the engine 2, the CPU starts processing in Step 1410 illustrated in FIG. 14. First, in Step 1410, it is determined whether or not the "status" has been updated.

When the "status" has been updated (Step 1410=Yes), the processing proceeds to Step 1420 where the adjustment value K is determined based on a table MapK(Cmax, status). When the "status" has not been updated (Step 1410=No), the processing in Step 1420 is skipped.

Figure 15:
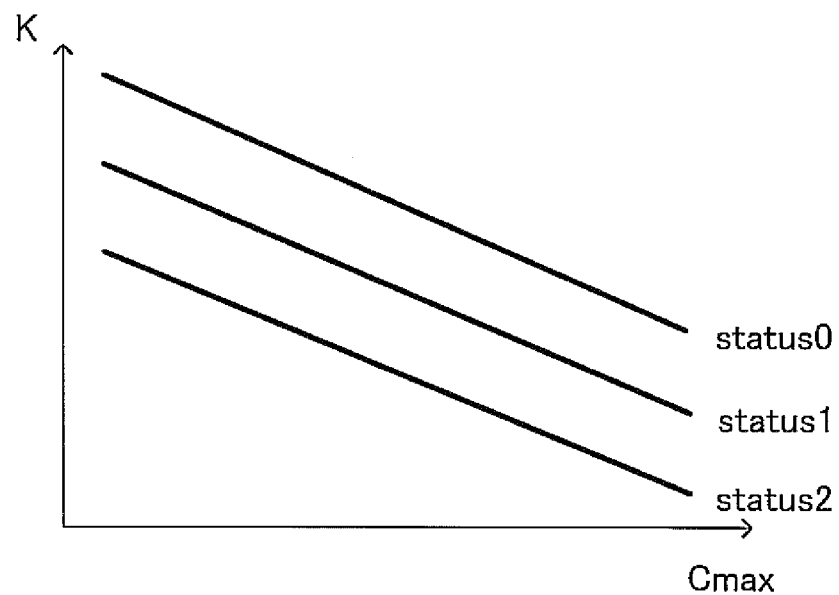
FIG. 15 is a graph illustrating an example of a lookup table to be referred to by the CPU of the electric controller illustrated in FIG. 1 to execute the routine illustrated in FIG. 14.

FIG. 15 shows the table MapK(Cmax, status) which defines the relation between a maximum oxygen storage amount Cmax of the upstream-side catalyst 43, the "status", and the adjustment value K. According to the table MapK (Cmax, status) shown in FIG. 15, the adjustment value K in each "status" becomes a smaller value as the maximum oxygen storage amount Cmax becomes larger.

Moreover, according to the table MapK(Cmax, status), when the maximum oxygen storage amount Cmax is constant, the adjustment value K is determined so that the adjustment value K in the status 0 becomes larger than that in the status 1 and the adjustment value K in the status 1 becomes larger than that in the status 2. As described above, when the maximum oxygen storage amount Cmax is constant, the "one-by-one" relation is established between the adjustment value K and the value of the "status".

The adjustment value K is used to update the time integral value SDVoxs in Step 1215 illustrated in FIG. 12, as described above. Therefore, when the "status" is "0", the update speed of the time integral value SDVoxs becomes higher than when the "status" is "1" or "2". Specifically, when the "status" is "0", the update speed of the sub-FB learning value Vafsfbg, that is, the learning speed becomes larger than when the "status" is "1" or "2" (see Steps 1215 and 1220 illustrated in FIG. 12). Similarly, when the "status" is "1", the update speed of the time integral value SDVoxs, that is, the update speed of the sub-FB learning value Vafsfbg becomes larger than when the "status" is "2".

The maximum oxygen storage amount Cmax of the upstream-side catalyst 43 is independently acquired by so-called active air-fuel ratio control. The active air-fuel ratio control is well-known control described in, for example, Japanese Patent Application Laid-open No. Hei 5-133264. Therefore, in this specification, the detailed description thereof is omitted. In this example, the maximum oxygen storage amount Cmax is stored and updated in the backup RAM each time the maximum oxygen storage amount Cmax is obtained and is read out from the backup RAM when to be used for the calculation of various parameters (the adjustment value K, the update inhibiting frequency L, and the like).

Next, in Step 1450, it is determined whether or not the current time is immediately after the termination of FC control. When the current time is immediately after the FC control is terminated (Step 1450=Yes), the processing proceeds to Step 1460 where the update inhibiting frequency L is determined based on a table MapL(Cmax, status). Thereafter, this routine is terminated. When the current time is not immediately after the termination of FC control (Step 1450=No), the processing in Step 1460 is skipped and this routine is terminated.

Figure 16:
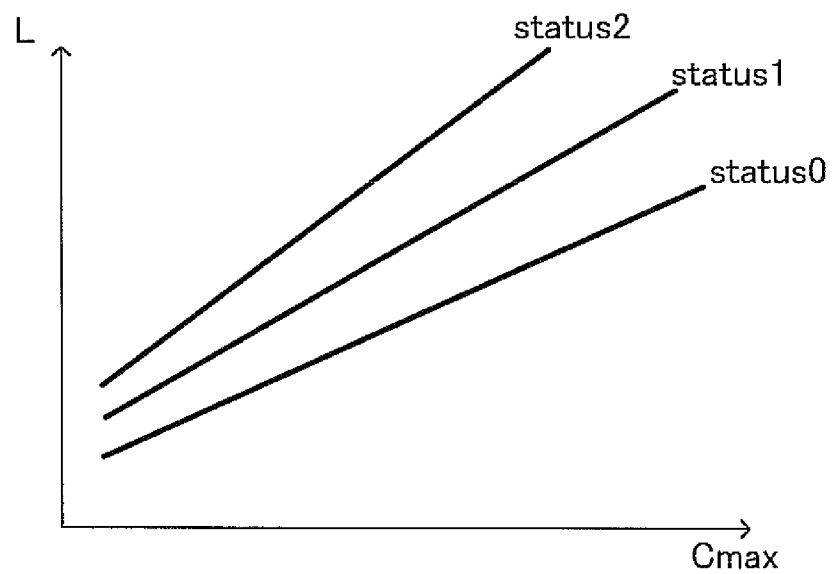
FIG. 16 is a graph illustrating an example of a lookup table to be referred to by the CPU of the electric controller illustrated in FIG. 1 to execute the routine illustrated in FIG. 14.

FIG. 16 shows the table MapL(Cmax, status) which defines the relation between the maximum oxygen storage amount Cmax of the upstream-side catalyst 43, the "status", and the update inhibiting frequency L. According to the table MapL (Cmax, status) shown in FIG. 16, the update inhibiting frequency L in each "status" is determined so that the update inhibiting frequency L becomes a larger value as the maximum oxygen storage amount Cmax becomes larger. Moreover, according to the table MapL(Cmax, status), when the maximum oxygen storage amount Cmax is constant, the update inhibiting frequency L is determined so that the update inhibiting frequency L in the status 0 becomes smaller than that in the status 1 and the update inhibiting frequency L in the status 1 becomes smaller than that in the status 2.

(6-6. Determination of "Status")

Figure 17:
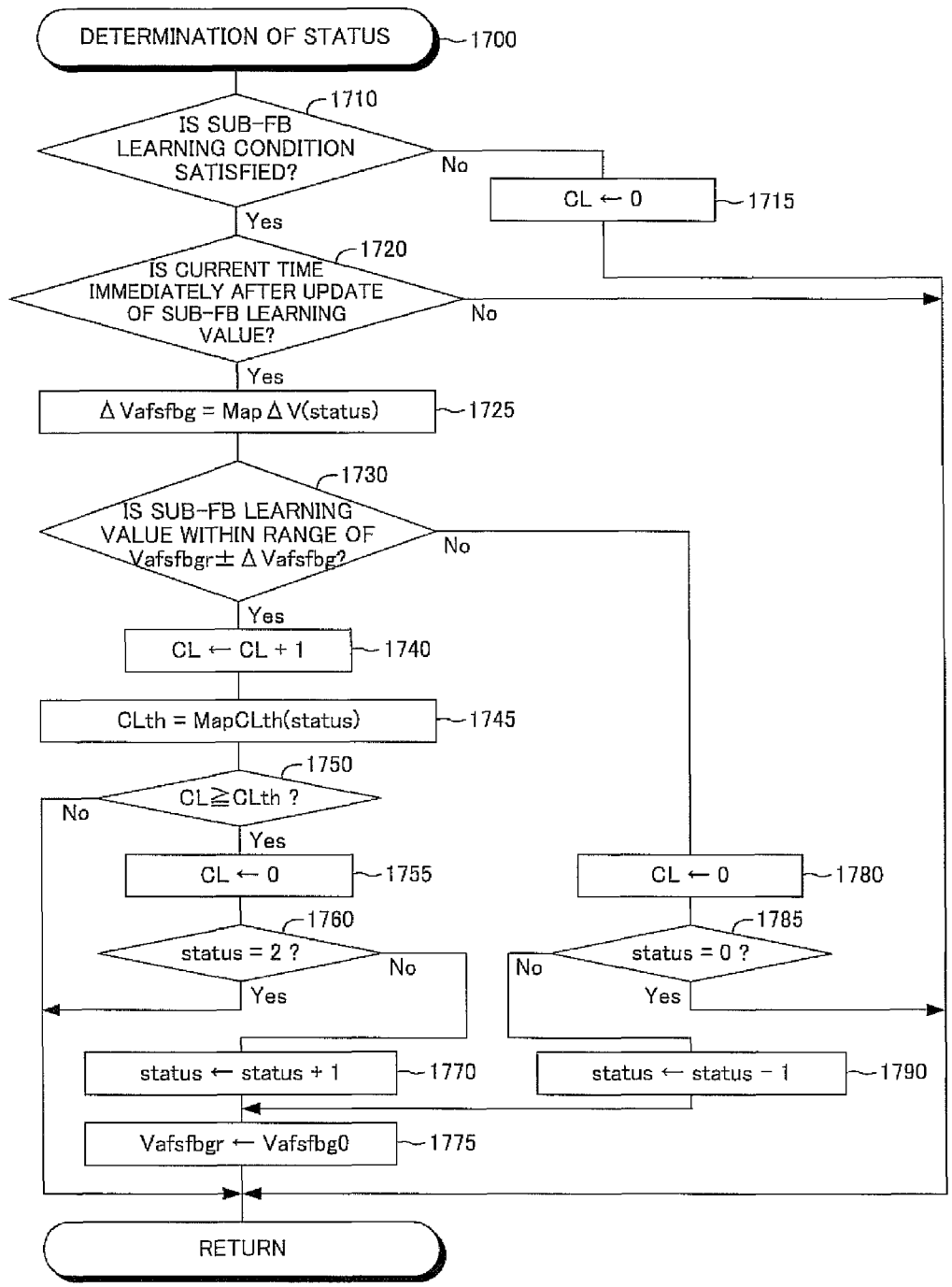
FIG. 17 is a flowchart illustrating a specific example of a routine executed by the CPU of the electric controller illustrated in FIG. 1 so as to determine and change a "status" indicating the degree of progress of sub-feedback learning, that is, a fluctuating state of the sub-feedback learning value.

The CPU repeatedly executes a status determination routine 1700 illustrated in FIG. 17 when each predetermined time elapses so as to determine and change the "status".

Therefore, at the predetermined timing, the CPU starts processing in Step 1710 to sequentially execute processing in the respective steps.

In Step 1710, it is determined whether or not the sub-FB learning condition is satisfied. When the sub-FB learning condition is not satisfied (Step 1710=No), the processing proceeds to Step 1715 where the counter CL is set to "0". Then, this routine is terminated. The counter CL is to be set to "0" by an initial routine (not shown) executed when an ignition key switch (not shown) of a vehicle in which the engine 2 is mounted is turned from an OFF position to an ON position.

Hereinafter, the description is continued assuming that the sub-FB learning condition is satisfied (Step 1710=Yes). Then, the processing proceeds to Step 1720 where it is determined whether or not the current time is immediately after the sub-FB learning value Vafsfbg is updated (whether or not the current time is immediately after the processing in Step 1215 and the processing in Step 1220 illustrated in FIG. 12 are performed). When the current time is not immediately after the sub-FB learning value Vafsfbg is updated (Step 1720=No), the processing in Step 1725 and the subsequent steps are skipped. Then, this routine is terminated.

On the other hand, when the current time is immediately after the sub-FB learning value Vafsfbg is updated (Step 1720=Yes), the processing proceeds to Step 1725 where a determination width ΔVafsfbg is set based on the "status" and a map (MapΔV) using the "status" as a parameter. In this step, the determination width ΔVafsfbg is set smaller as the "status" is in a more stable direction. In other words, the determination width ΔVafsfbg is set so as to be narrower in the status 1 than in the status 0 and narrower in the status 2 than in the status 1. Then, in Step 1730, it is determined whether the sub-FB learning value Vafsfbg is within the range of the determination width ΔVafsfbg from the criterion value Vafsfbgr (range of 2×ΔVafsfbg with the criterion value Vafsfbgr as a center). The criterion value Vafsfbrg is set based on a value Vafsfbg0 obtained by performing lowpass filter processing on the sub-FB learning value Vafsfbg when the "status" is changed by the previous execution of the status determination routine 1700, as described below.

When the sub-Fb learning value Vafsfbg is within the range of the determination width ΔVafsfbg from the criterion value Vafsfbgr (Step 1730=Yes), the processing proceeds to Step 1740 where the counter CL is incremented by "1". Subsequently, in Step 1745, an update frequency threshold value CLth is set based on the "status" and the map with the "status" as the parameter. Then, in subsequent Step 1750, it is determined whether or not the counter CL is equal to or larger than the update frequency threshold value CLth described above.

When the sub-FB learning value Vafsfbg continuously falls within the range of the determination width ΔVafsfbg from the criterion value Vafsfbgr over a predetermined period of time (more specifically, until the counter CL becomes equal to or larger than the update frequency threshold value CLth without being cleared), it can be said that the sub-FB learning value Vafsfbg tends to converge. Therefore, in this case, the result of determination in Step 1750 is "Yes". Then the processing proceeds to Step 1755 where the counter CL is reset. In subsequent Step 1760, it is determined whether or not the current "status" is "2". When the current "status" is not "2" (specifically, the current "status" is "0" or "1"; Step 1760=No), the processing proceeds to Step 1770 where the "status" is changed in the stable direction by one step. At this time, the value of the "status" before being changed is stored in the backup RAM as a previous determination value status_old. Next, in Step 1775, the new criterion value Vafsfbgr is set based on the value Vafsfbg0 obtained by performing the lowpass filter processing on the sub-FB learning value Vafsfbg. Thereafter, this routine is terminated.

When the counter CL is smaller than the update frequency threshold value CLth (Step 1750=No), the processing in Steps 1755 to 1775 is skipped. Then, this routine is terminated. Even if the counter CL is equal to or larger than the update frequency threshold value CLth (Step 1750=Yes), when the current "status" is "2" (Step 1760=Yes), the processing in Steps 1770 and 1775 is skipped because the "status" cannot be changed in the stable direction any more. Then, this routine is terminated.

When the sub-FB learning value Vafsfbg does not fall within the range of the determination width ΔVafsfbg from the criterion value Vafsfbgr (Step 1730=No), it can be said that the sub-FB learning value is destabilized. Therefore, in this case, the processing proceeds from Step 1730 to Step 1780 where the counter CL is reset. In subsequent Step 1785, it is determined whether or not the current "status" is "0". When the current "status" is not "0" (Step 1785=No), specifically, the current "status" is "2" or "1", the processing proceeds to Step 1790 where the "status" is changed by one step in the unstable direction. At this time, the value of the "status" before being changed is stored in the backup RAM as the previous determination value status_old. Thereafter, the processing proceeds to Step 1775 where the new criterion value Vafsfbrg is set based on the value Vafsfbg0 obtained by performing the lowpass filter processing on the sub-FB learning value Vafsfbg. Thereafter, this routine is terminated. When the current "status" is "0" (Step 1785=Yes), the "status" cannot be changed in the unstable direction any more. Therefore, the processing in Steps 1790 and 1775 is skipped, and this routine is terminated.

The operation of determining and changing the "status" described above is outlined as follows.

When the sub-FB learning value Vafsfbg falls within the range of the predetermined determination width ΔVafsfbg (first determination width ΔVafsfbg1) in the status 0 from the criterion value Vafsfbgr obtained by processing the sub-FB learning value Vafsfbg with the lowpass filter, the "status" is changed from "0" to "1" (shifted by one step). On the other hand, when the sub-learning value Vafsfbg does not fall within the range of the predetermined determination width ΔVafsfbg (second determination width ΔVafsfbg2: smaller than ΔVafsfbg1) in the status 1 from the criterion value Vafsfbgr, the "status" is changed from "1" to "0" in the reverse manner.

Also, when the sub-FB learning value Vafsfbg falls within the range of the predetermined determination width ΔVafsfbg (third determination width ΔVafsfbg3: the same value as ΔVafsfbg2 in this example) in the status 1 from the criterion value Vafsfbgr, the "status" is changed from "1" to "2". On the other hand, when the sub-FB learning value Vafsfbg does not fall within the range of the predetermined determination width ΔVafsfbg (fourth determination width ΔVafsfbg4: smaller than ΔVafsfbg3) in the status 2 from the criterion value Vafsfbgr, the "status" is changed from "2" to "1" in the reverse manner.

When the "status" is "0", the adjustment value K is set to a large value. In this manner, the update amount K×DVox (absolute value thereof) of the time integral value SDVoxs per one update is set to a large value. Specifically, through use of the large adjustment value K, the sub-feedback amount Vafsfb and the time integral value SDVoxs (that is, the sub-FB learning value Vafsfbg) are updated quickly. Further, the update inhibiting frequency L is set to a small value immediately after the termination of the FC control. As a result, when the FC control is executed, the time integral value SDVoxs is maintained to a constant value over a relatively short period of time in accordance with the update inhibiting frequency L after the recovery from the FC control. Specifically, through use of the small update inhibiting frequency L, an update frequency (learning frequency) of the sub-FB learning value Vafsfbg becomes high.

When the "status" is changed from "0" to "1", the adjustment value K is set (changed) to an intermediate value from the large value. Therefore, the update amount K×DVoxs (absolute value thereof) of the time integral value SDVoxs per one update is also set to an intermediate value. Moreover, the update inhibiting frequency L is set to an intermediate value immediately after the termination of the FC control. Therefore, when the "status" is changed from "0" to "1", the sub-FB learning value Vafsfbg (time integral value SDVoxs) becomes further closer and converges to the convergence value SDVoxs1 from a value relatively close to the convergence value SDVoxs1 at an intermediate changing speed.

When the "status" is changed from "1" to "2", the adjustment value K is set (changed) to a small value from the intermediate value. Therefore, the update amount K×DVoxs (absolute value thereof) of the time integral value SDVoxs per one update is also set to a small value. Moreover, the update inhibiting frequency L is set to a large value immediately after the termination of the FC control. Therefore, when the "status" is changed from "1" to "2", the changing speed of the sub-FB learning value Vafsfbg (time integral value SDVoxs) becomes smaller than that in the case where the "status" is "1". In this step, the sub-FB learning value Vafsfbg (time integral value SDVoxs) is sufficiently close to the convergence value SDVoxs1. Therefore, the sub-FB learning value Vafsfbg (time integral value SDVoxs) is stably maintained to a value in the vicinity of the convergence value SDVoxs1 even when a condition in which the air-fuel ratio is fluctuated, i.e., disturbance occurs.

As described above, the "status" is determined, changed, or set based on a fluctuation width of the sub-FB learning value Vafsfbg in a predetermined period of time (period of time in which the counter CL reaches the update frequency threshold value CLth from 0, in other words, a period of time in which the sub-FB learning value Vafsfbg is updated for a predetermined number of times). Then, in accordance with the result of determination (setting) of the "status", the update speed (learning speed) of the sub-FB learning value Vafsfbg is changed or set. At this time, the update speed of the sub-FB learning value is set so that the update speed in the status 0 is larger than that in the status 1 and the update speed in the status 1 is larger than that in the status 2.

Here, in this embodiment, as described above, the "status" is determined based on the criterion value Vafsfbgr acquired based on the value Vafsfbg0 obtained by performing the lowpass filter processing on the sub-FB learning value Vafsfbg and the determination width ΔVafsfbg set so that the determination width ΔVafsfbg becomes larger in the status 0 than in the status 1 and becomes larger in the status 1 than in the status 2. At this time, the time constant τ of the lowpass filter is changed corresponding to the adjustment value K (update speed of the sub-FB learning value Vafsfbg) set based on the "status". Specifically, the time constant τ is set larger as the learning speed becomes higher. Then, based on the result of determination of the "status" described above, the three-step setting state of the "status" is shifted (changed) by one step for each time, that is, from "0" to "1", from "1" to "2", from "2" to "1", or from "1" to "0". Further, corresponding to the stepwise shift of the "status" described above, the update speed (learning speed) of the sub-FB learning value Vafsfbg is changed in a stepwise manner.

As described above, in this embodiment, the update speed of the sub-FB learning value is appropriately set in accordance with the fluctuating state of the sub-FB learning value Vafsfbg. Specifically, the update speed of the sub-FB learning value Vafsfbg is gradually changed when the result of determination of the "status" becomes different so that the hunting of the sub-feedback learning value Vafsfbg is suppressed. As a result, the improper repeated change of the set state of the "status" (specifically, the set state of the update speed of the sub-FB learning value) is suppressed as much as possible. Therefore, according to this embodiment, the sub-FB learning value Vafsfbg more quickly converges.

In the meantime, the "status" is also referred to even when it is determined whether or not to perform an abnormality determination (imbalance abnormality determination) as described in detail below.

(6-7. Counting of Learning Update Frequency)

Next, a method of updating a counter CK indicating the learning update frequency to be referred to when it is determined whether or not to perform the imbalance abnormality determination described below is described. The counter CK is set to "0" in the initial routine described above.

Figure 18:
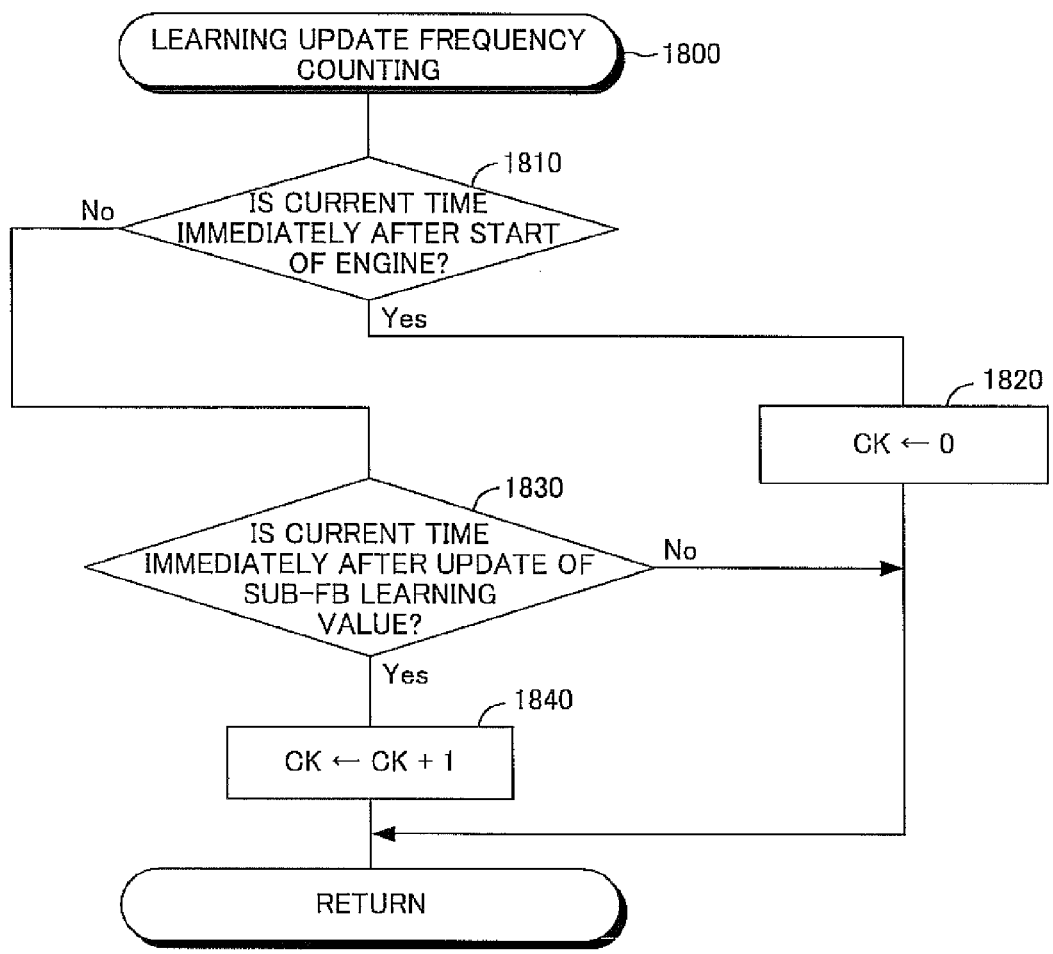
FIG. 18 is a flowchart illustrating a specific example of a routine executed by the CPU of the electric controller illustrated in FIG. 1 to update a counter (referred to for determining whether or not to make an imbalance abnormality determination) indicating a learning update frequency.

The CPU repeatedly executes a learning update frequency counting routine 1800 illustrated in FIG. 18 to update the counter CK when each predetermined time elapses. Therefore, at the predetermined timing, the CPU starts processing in Step 1810 to sequentially execute processing in the respective steps.

In Step 1810, it is determined whether the engine 2 is immediately after starting. When the engine 2 is immediately after starting (Step 1810=Yes), the processing proceeds to Step 1820 where the counter CK is set to "0". Then, this routine is terminated. On the other hand, when the engine 2 is not immediately after starting (Step 1810=No), the processing proceeds to Step 1830 where it is determined whether or not the current time is immediately after the update of the sub-FB learning value Vafsbg.

When the current time is not immediately after the update of the sub-FB learning value Vafsfbg (Step 1830=No), processing in Step 1840 is skipped and this routine is terminated. On the other hand, when the current time is immediately after the update of the sub-FB learning value Vafsfbg (Step 1830=Yes), the processing proceeds to Step 1840 where the counter CK is incremented by "1". Then, this routine is terminated. As described above, the counter CK has a value indicating the update frequency of the sub-FB learning value Vafsfbg after the start of the engine 2 for the current time.

(6-8. Imbalance Abnormality Determination)

Next, processing for determining whether or not excessive air-fuel ratio imbalance has occurred as an abnormality state of the engine 2 is described.

Figure 19:
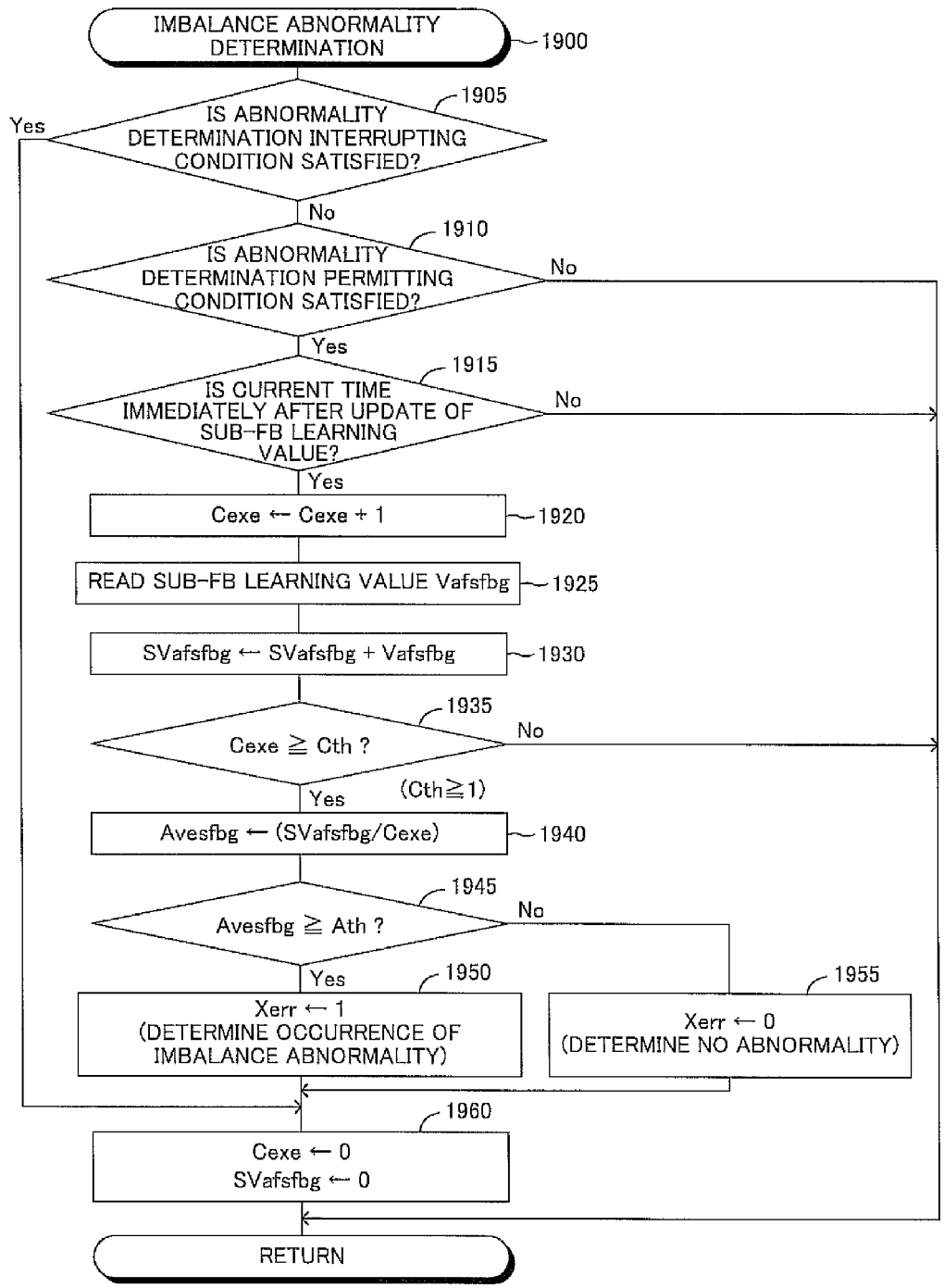
FIG. 19 is a flowchart illustrating a specific example of a routine executed by the CPU of the electric controller illustrated in FIG. 1 to make the imbalance abnormality determination.

The CPU repeatedly executes an imbalance abnormality determination routine 1900 illustrated in FIG. 19 when each predetermined time elapses.

Based on the routine 1900, an average of a plurality of the sub-FB learning values Vafsfbg, which are obtained when an "abnormality determination interrupting condition" described below is not satisfied and an "abnormality determination permitting condition" described below is satisfied, is obtained as a "sub-FB learning value average value Avesfbg" (see Step 1940 described below). The sub-FB learning value average value Avesfbg is used as the parameter for abnormality determination (parameter for imbalance determination). When the sub-FB learning value average value Avesfbg is equal to or larger than the abnormality criterion threshold value Ath, it is determined that the abnormality state has occurred (specifically, the imbalance abnormality has occurred).

At the predetermined timing, the CPU starts processing in Step 1905 to sequentially execute processing in the respective steps.

First, in Step 1905, it is determined whether or not the abnormality determination interrupting condition is satisfied. The "abnormality determination interrupting condition" is a condition for inhibiting the abnormality determination. In the case where the abnormality determination interrupting condition is not satisfied, an "abnormality determination execution precondition" is satisfied. The abnormality determination interrupting condition is satisfied when at least one of the following conditions (C1) to (C6) is satisfied.

(C1) The main feedback control condition is not satisfied.
(C2) The sub-feedback control condition is not satisfied.
(C3) The learning condition of the sub-feedback amount is not satisfied.
(C4) The oxygen storage amount of the upstream-side catalyst 43 is equal to or smaller than a first threshold value oxygen storage amount.
(C5) It is estimated that the upstream-side catalyst 43 is not activated.
(C6) A flow rate of the exhaust gas exhausted from the engine 2 is equal to or larger than an exhaust-gas flow rate threshold value. Specifically, the intake air amount Ga measured by the airflow meter 51 or the load KL of the engine is equal to or larger than a threshold value.

The reason why the above-mentioned condition (C4) is provided is as follows.

When the oxygen storage amount of the upstream-side catalyst 43 is equal to or smaller than the first threshold value oxygen storage amount, hydrogen is not sufficiently purified in the upstream-side catalyst 43. Therefore, there is a possibility that hydrogen may flow out downstream of the upstream-side catalyst 43. As a result, there is a possibility that the output value Voxs of the downstream-side air-fuel ratio sensor 56 may be affected by the selective diffusion of hydrogen. In other cases, the air-fuel ratio of the gas at the downstream of the upstream-side catalyst 43 does not become equal to a true average value of the air-fuel ratios of the mixture supplied to the entire engine 2. Therefore, there is a high possibility that the output value Voxs of the downstream-side air-fuel ratio sensor 56 does not has a value in accordance with the "true average value of the air-fuel ratios excessively corrected by the air-fuel ratio feedback control using the output value Vabyfs of the upstream-side air-fuel ratio sensor 55". Therefore, if the air-fuel ratio imbalance abnormality determination is executed in the above-mentioned state, there is a high possibility of erroneous determination.

The oxygen storage amount of the upstream-side catalyst 43 is independently acquired by a well-known method. For example, an oxygen storage amount OSA of the upstream-side catalyst 43 is obtained by sequentially adding the amounts, each corresponding to an excessive oxygen amounts flowing into the upstream-side catalyst 43, and sequentially subtracting the amounts, each corresponding to an excessive unburned-component amount flowing into the upstream-side catalyst 43. Specifically, an excessive/deficient amount $\Delta O2$ ($\Delta O2=k \times mfr \times (abyfs-stoich)$) of oxygen is obtained based on a difference between the upstream-side air-fuel ratio "abyfs" and the stoichiometric air-fuel ratio "stoich" when each predetermined time elapses ("k" is a ratio of oxygen in the atmosphere and is 0.23, and "mfr" is a fuel amount supplied in the predetermined time). The excessive/deficient amount $\Delta 2$ is integrated to obtain the oxygen storage amount OSA (see Japanese Patent Application Laid-open Nos. 2007-239700, 2003-336535, 2004-036475, and the like).

The reason why the above-mentioned condition (C6) is provided is as follows.

When the flow rate of the exhaust gas exhausted from the engine 2 is equal to or larger than the exhaust-gas flow rate threshold value, the amount of hydrogen flowing into the upstream-side catalyst 43 exceeds a hydrogen oxidizing ability of the upstream-side catalyst 43. As a result, in some cases, hydrogen flows out downstream of the upstream-side catalyst 43. Therefore, there is a high possibility that the output value Voxs of the downstream-side air-fuel ratio sensor 56 may be affected by the selective diffusion of hydrogen. In other cases, the air-fuel ratio of the gas at the downstream of the catalyst does not become equal to the true average value of the air-fuel ratios of the mixture supplied to the entire engine 2. As a result, even when the air-fuel ratio imbalance occurs, there is a high possibility that the output value Voxs of the downstream-side air-fuel ratio sensor 56 does not exhibit a value in accordance with the "true air-fuel ratio excessively corrected by the air-fuel ratio feedback control using the output value Vabyfs of the upstream-side air-fuel ratio sensor 55". Therefore, if the air-fuel ratio imbalance abnormality determination is executed in the state described above, there is a high possibility of erroneous determination.

Further, the abnormality determination interrupting condition is satisfied when at least one of the following conditions (D1) to (D3) is satisfied. The reason why the conditions (D1) to (D3) are added is described later.

(D1) The "update frequency of the sub-FB learning value Vafsfbg" after the start of the engine 2 for the current time is smaller than the "learning update frequency threshold value". Specifically, the counter CK is smaller than the learning update frequency threshold value CKth.
(D2) A value of status_now (the latest value of the "status") corresponding to a value of the "status" at the current determination of the "status" is "0". Specifically, the convergent state of the sub-FB learning value Vafsfbg is not good (in the unstable state).
(D3) A value of status_old corresponding to a value of the "status" at the previous determination of the "status" is "2" and a value of status_now corresponding to a value of the "status" (latest "status") at the current determination of the "status" is "1". Specifically, the convergent state of the sub-FB learning value Vafsfbg changes from the stable state to the intermediate state.

Here, it is supposed that the above-mentioned abnormality determination interrupting condition is not satisfied (none of the above-mentioned conditions (C1) to (C6) and (D1) to (D3) is satisfied). In other words, it is supposed that the abnormality determination precondition is satisfied.

In this case, the result of determination in Step 1905 is "No". Then, the processing proceeds to Step 1910 where it is determined whether or not the abnormality determination permitting condition is satisfied. The abnormality determination permitting condition is satisfied when the following conditions (E1) and (E2) are satisfied. The reason why the above-mentioned conditions are added is described below.

(E1) The "update frequency of the sub-FB learning value Vafsfbg" after the start of the engine 2 for the current time is equal to or larger than the "learning update frequency threshold value". Specifically, the counter CK is equal to or larger than the learning update frequency threshold value CKth.
(E2) A value of status_now corresponding to the value of the "status" (latest "status") at the current determination of the "status" is "2". Specifically, the convergent state of the sub-FB learning value Vafsfbg is good (in the stable state).

When the abnormality determination permitting condition is satisfied (Step 1910=Yes), the processing proceeds to Step 1915 and the subsequent steps. The processing after Step 1915 is processing for abnormality determination (air-fuel ratio imbalance abnormality determination).

Step 1915: It is determined whether or not the current time is time immediately after the sub-FB learning value Vafsfbg is updated (immediately after the sub-FB learning value is updated). When the current time is immediately after the sub-FB learning value is updated (Step 1915=Yes), the processing proceeds to Step 1920. When the current time is not immediately after the sub-FB learning value is updated (Step 1915=No), the processing after Step 1920 is skipped. Then, this routine is terminated.

Step 1920: A value Cexe of a learning value integrating counter is incremented by "1".

Step 1925: The sub-FB learning value Vafsfbg stored in the backup RAM in Step 1220 illustrated in FIG. 12 is read.

Step 1930: An integrated value SVafsfbg of the sub-FB learning value Vafsfbg is updated. Specifically, the sub-FB learning value Vafsfbg read in Step 1925 is added to the integrated value SVafsfbg at the current time to obtain the new integrated value SVafsfbg.

Note that the integrated value SVafsfbg is to be set to "0" by the above-mentioned initial routine. The integrated value SVafsfbg is also set to "0" by processing in Step 1960 described below. This Step 1960 is executed when the abnormality determination (imbalance abnormality determination: Steps 1945 to 1955) is performed. Therefore, the integrated value SVafsfbg is an integral value of the sub-FB learning value Vafsfbg which is updated in a state in which the abnormality determination interrupting condition is not satisfied (see Step 1905) and the abnormality determination permitting condition is satisfied (see Step 1910) after the start of the engine 2 or the last execution of the abnormality determination.

Step 1935: It is determined whether the value Cexe of the learning value integrating counter is equal to or larger than the counter threshold value Cth. When the value Cexe of the learning value integrating counter is smaller than the counter threshold value Cth (Step 1935=No), the processing after Step 1940 is skipped. Then, this routine is terminated. On the other hand, the value Cexe of the learning value integrating counter is equal to or larger than the counter threshold value Cth (Step 1935=Yes), the processing proceeds to Step 1940 and the subsequent steps.

Step 1940: The integrated value SVafsfbg of the sub-FB learning value Vafsfbg is divided by the value Cexe of the learning value integrating counter to obtain the sub-FB learning value average value Avesfbg (specifically, a timelike average value of the learning values Vafsfbg). As described above, the sub-FB learning value average value Avesfbg is the parameter for imbalance determination (parameter for abnormality determination) which becomes larger as a difference between the amount of hydrogen contained in the exhaust gas before passing through the upstream-side catalyst 43 and the amount of hydrogen contained in the exhaust gas after passing through the upstream-side catalyst 43 becomes larger. In other words, the parameter for abnormality determination is a value changing in accordance with the learning value Vafsfbg (value which becomes larger as the learning value Vafsfbg becomes larger) and is calculated based on the learning value Vafsfbg.

Step 1945: It is determined whether or not the sub-FB learning value average value Avesfbg is equal to or larger than the abnormality determination threshold value Ath. As described above, when the non-uniformity of the air-fuel ratios between the cylinders 21 becomes excessive to cause the imbalance abnormality, the sub-feedback amount Vafsfb is going to be a value for greatly correcting the air-fuel ratio of the mixture supplied to the engine 2 toward the rich side. With the correction, the sub-FB learning value average value Avesfbg, which is the average value of the sub-FB learning values Vafsfbg, becomes a value (value equal to or larger than the threshold value Ath) for greatly correcting the air-fuel ratio of the mixture supplied to the engine 2 toward the rich side.

Therefore, when the sub-FB learning value average value Avesfbg is equal to or larger than the abnormality criterion threshold value Ath (Step 1945=Yes), the processing proceeds to Step 1950 where an abnormality occurrence flag Xerr is set. Specifically, a value of the abnormality occurrence flag Xerr is set to "1". Here, when the value of the abnormality occurrence flag Xerr is "1", it means that the imbalance abnormality occurs. The value of the abnormality occurrence flag Xerr is stored in the backup RAM. Further, when the value of the abnormality occurrence flag Xerr is set to "1", an alarm lamp (not shown) is lighted by the CPU.

On the other hand, when the sub-FB learning value average value Avesfbg is smaller than the abnormality determination threshold value Ath (Step 1945=No), the processing proceeds to Step 1955 where the abnormality occurrence flag Xerr is reset so as to indicate that the imbalance abnormality does not occur. Specifically, the value of the abnormality occurrence flag Xerr is set to "0".

Step 1960: After the processing in Step 1950 or Step 1955, the value Cexe of the learning value integrating counter is set to "0" (is reset). Moreover, the integrated value SVafsfbg of the sub-FB learning value is set to "0" (is reset).

In the meantime, when the abnormality determination interrupting condition is satisfied (Step 1905=Yes), the processing directly proceeds from Step 1905 to Step 1960. As a result, when the abnormality determination interrupting condition is satisfied, the integrated value SVafsfbg of the sub-FB learning values integrated up to the time is discarded.

When the abnormality determination permitting condition is not satisfied in Step 1910 (Step 1910=No), the processing after Step 1915 is skipped. Then, this routine is terminated. In this case, the integrated value SVafsfbg of the sub-FB learning values calculated up to then is not discarded. In other words, only the sub-FB learning value Vafsfbg at the time when the abnormality determination permitting condition is satisfied is reflected in the parameter for imbalance determination (parameter for abnormality determination).

The reason why the above-mentioned conditions (D1) to (D3), and (E1) and (E2) are added is now described.

(6-8-1. The Reason why the Conditions (D1) and (E1) are Provided)

In the case where data in the backup RAM is lost by removing the battery from the vehicle or the like, a considerably long time is required after the start of the engine 2 for the convergent state of the learning value Vafsfbg to change into a state in which the abnormality determination is permitted (for example, status 2). On the other hand, after the time at which the update frequency (counter CK) of the learning value Vafsfbg after the start of the engine 2 reaches a predetermined learning update frequency threshold value (CKth), the convergent state of the learning value Vafsfbg becomes closer to the stable state.

On the other hand, in the case where the data in the backup RAM is not lost, when the convergent state of the learning value Vafsfbg is, for example, the stable state (specifically, status 2) at the time of termination of the previous operation of the engine 2, the abnormality determination is performed within a relatively short period of time after the start of the current operation. In the current operation, however, there is a possibility that the state of the engine 2 has changed. Therefore, it is desirable to perform the abnormality determination (imbalance abnormality determination) at least after the time at which the update frequency (counter CK) of the learning value Vafsfbg after the start of the engine 2 reaches the predetermined update frequency threshold value (CKth).

From the above-mentioned point of view, the conditions (D1) and (E1) are provided. Specifically, the CPU acquires the update frequency of the learning value Vafsfbg after the start of the engine 2 (refers to the counter CK) and interrupts the execution of the abnormality determination within a period of time in which the acquired update frequency (counter CK) of the learning value Vafsfbg is smaller than the predetermined learning update frequency threshold value (CKth) (see the condition (D1) and Step 1905).

Further, the CPU acquires the update frequency of the learning value Vafsfbg after the start of the engine 2 (refers to the counter CK) and permits the execution of the abnormality determination based on the condition that the acquired update frequency (counter CK) of the learning value Vafsfbg is equal to or larger than the predetermined learning frequency threshold value (CKth) (see the condition (E1) and Step 1915).

With the conditions described above, the parameter for abnormality determination (parameter for imbalance determination) can be acquired based on the learning value Vafsfbg at which the convergent state becomes good, regardless of whether or not the data in the backup RAM is lost. Further, the time period or time from the start of the engine 2 to the execution of the abnormality determination (imbalance abnormality determination) in the case where the data in the backup RAM is not lost can be made approximately equal to that in the case where the data in the backup RAM is lost.

(6-8-2. The Reason why the Condition (D2) is Provided)

When the value of status_now is "0" (see the condition (D2) and Step 1905), it means that the convergent state of the learning value Vafsfbg at the current time is not good. Specifically, when the condition (D2) is satisfied, there is a high possibility that the learning value Vafsfbg diverges from the convergence value and the changing speed of the learning value Vafsfbg is large. Therefore, when the condition (D2) is satisfied, the abnormality determination is interrupted. As a result, the parameter for abnormality determination (parameter for imbalance determination) can be avoided from being calculated based on the learning value Vafsfbg which has a high possibility of not being a value in the vicinity of the convergence value. Therefore, an erroneous abnormality determination can be avoided.

(6-8-3. The Reason why the Condition (D3) is Provided)

When the value of status_old is "2" and the value of status_now is "1" (see the condition (D3) and Step 1905), it means that the convergent state of the learning value Vafsfbg has changed from a state in which the convergent state of the learning value Vafsfbg is determined as being the stable state to a state in which the convergent state of the learning value Vafsfbg is determined as being the intermediate state.

In the above-mentioned circumstances, it is considered that the convergent state of the learning value Vafsfbg is changing from the stable state to the unstable state for some reason (for example, for a reason such as an abrupt change in convergence value or the occurrence of a disturbance which temporarily brings about a great fluctuation in air-fuel ratio). In other words, the learning value Vafsfbg in the above-mentioned state has a high possibility of not being a value in the vicinity of the convergence value. Therefore, when the condition (D3) is satisfied, the abnormality determination is interrupted. As a result, the calculation of the parameter for abnormality determination (parameter for imbalance determination) based on the learning value Vafsfbg having a high possibility of not being a value in the vicinity of the convergence value can be avoided. Therefore, an erroneous abnormality determination can be prevented from occurring.

(6-8-4. The Reason why the Condition (E2) is Provided)

When the value of status_now is "2" (see the condition (E2) and Step 1910), it means that the convergent state of the learning value Vafsfbg at the current time is good and the learning value Vafsfbg is stable in the vicinity of the convergence value. Therefore, when the condition (E2) is satisfied (along with the condition (E1) described above), the abnormality determination is allowed. As a result, the parameter for abnormality determination, that is, the parameter for imbalance determination can be calculated based on the learning value Vafsfbg having a high possibility of being a value in the vicinity of the convergence value. As a result, the abnormality determination can be made with good accuracy.

7. Another Specific Example

Figure 20:
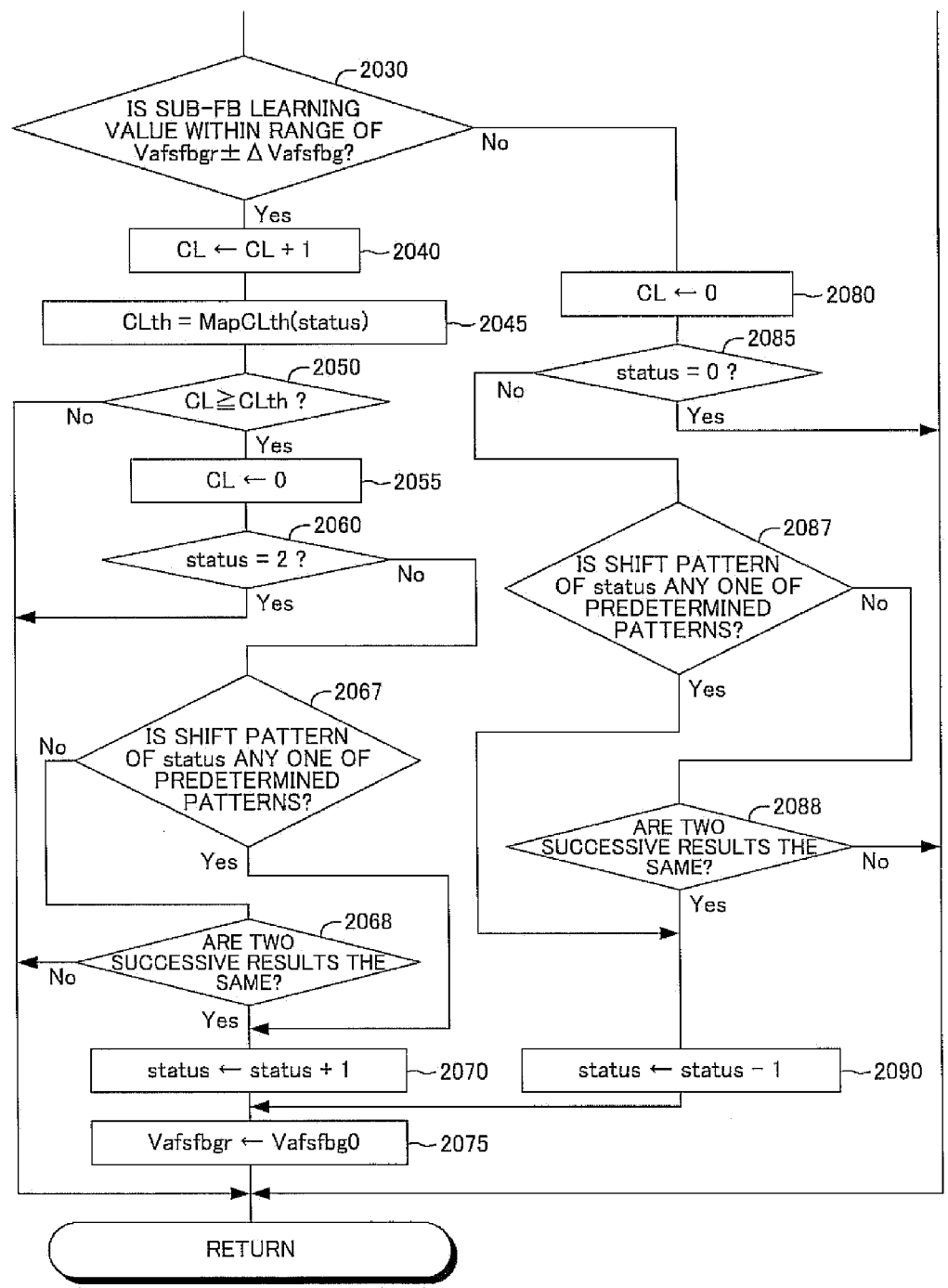
FIG. 20 is a flowchart illustrating another specific example of the routine executed by the CPU of the electric controller illustrated in FIG. 1 to determine and change the "status"

Next, an example where the routine illustrated in FIG. 17 is partially altered is described referring to FIG. 20. A first half of the flowchart of FIG. 20 (before Step 2030) is the same as Steps 1710 to 1730 of the flowchart of FIG. 17 and therefore, the illustration thereof is omitted. Hereinafter, processing after Step 2030 is described referring to FIG. 20.

When the sub-FB learning value Vafsfbg falls within the range of the determination width ΔVafsfbg from the criterion value Vafsfbgr (Step 2030=Yes), the processing proceeds to Step 2040 where the counter CL is incremented by "1". Subsequently, in Step 2045, the update frequency threshold value CLth is set based on the "status" and a map using the "status" as a parameter. Then, in subsequent Step 2050, it is determined whether or not the counter CL is equal to or larger than the above-mentioned update frequency threshold value CLth.

When the sub-FB learning value Vafsfbg continuously falls within the range of the determination width ΔVafsfbg from the criterion value Vafsfbgr over a predetermined period of time, it can be said that the sub-FB learning value Vafsfbg tends to converge. Therefore, in this case, the result of determination in Step 2050 is "Yes". Then the processing proceeds to Step 2055 where the counter CL is reset. In subsequent Step 2060, it is determined whether or not the value of the current "status" is "2".

When the current "status" is not "2" (when the current "status" is "0" or "1": Step 2060=No), the processing proceeds to Step 2067 where it is determined whether or not a shift pattern of the "status" is identical with a predetermined pattern. The reason why the determination described above is made is as follows.

A large number of shift patterns are present in terms of format as the shift pattern between three-step "status" (0, 1, and 2). In practice, however, there is a high possibility of erroneous determination other than in the cases described below.

0-1-2: As described above, after the result of learning is once cleared by battery replacement or the like, the learning is restarted from the beginning.

2-1-0: The convergent state of the sub-FB learning value Vafsfbg shifts from the stable state to the unstable state through the intermediate state due to the occurrence of the imbalance abnormality or the like.

2-1-2: When the convergent state of the sub-FB learning value Vafsfbg is the stable state, a small learning deviation occurs in the sub-FB learning value Vafsfbg due to some factor.

Therefore, in Step 2067, it is determined whether or not the previous determination value status_old stored in the backup RAM, the current value of the "status", the current determination value status_next are identical with any one of the above-mentioned three patterns.

When the shift pattern of the "status" is identical with none of the predetermined patterns (Step 2067=No), the processing proceeds to Step 2068 where it is determined whether or not the current determination value status_next is the same as the previous value, that is, whether or not the two successive results of determination of the "status" are the same.

When the current determination value status_next is not the same as the previous value (Step 2068=No), the previous value of status_next stored in the backup RAM is rewritten by the current value. Thereafter, this routine is terminated. Specifically, the change of the set state of the "status" (update speed of the sub-FB learning value Vafsbg) is temporarily suspended.

On the other hand, when the current determination value status_next is the same as the previous value (Step 2068=Yes), the processing proceeds to Steps 2070 and 2075 where the processing is performed in the same manner as that in Steps 1770 and 1775 (see FIG. 17) described above. Then, this routine is terminated. Specifically, in this case, the "status" is changed by one step in the stable direction.

Similarly, when the sub-FB learning value Vafsfbg does not fall within the range of the determination width ΔVafsfbg from the criterion value Vafsfbgr (Step 2030=No) and the current "status" is "2" or "1" (Step 2085=No), the processing proceeds to Step 2087 where it is determined whether or not the shift pattern of the "status" is identical with any one of the predetermined patterns, similarly to Step 2067 described above.

When the shift pattern of the "status" is identical with none of the predetermined patterns (Step 2087=No), the processing proceeds to Step 2088 where it is determined whether or not the currently determined value status_next is the same as the previous value, that is, the two successive results of determination of "status" are the same.

When the currently determined value status_next is not the same as the previous value (Step 2088=No), the previous value of status_next stored in the backup RAM is rewritten by the current value. Thereafter, this routine is terminated. Specifically, the change of the set state of "status" (update speed of the sub-FB learning value Vafsfbg) is temporarily suspended.

On the other hand, when the currently determined value status_next is the same as the previous value (Step 2088=Yes), the processing proceeds to Steps 2090 and 2075 where the same processing as that of Steps 1790 and 1775 described above (see FIG. 17) is performed. Then, this routine is terminated. Specifically, in this case, the "status" is changed by one step in the unstable direction.

As described above in detail, in this specific example, when the shift pattern of the "status" is identical with any one of the predetermined patterns described above, the sub-FB learning value Vafsfbg is permitted to be changed. On the other hand, when the shift pattern of the "status" is identical with none of the predetermined patterns described above, the change of the set state of the "status" (update speed of the sub-FB learning value Vafsfbg) is temporarily suspended. Then, when the two successive results of determination are the same, the "status" is permitted to be changed.

As a result, the improper repeated change of the set state of the "status" (specifically, the set state of the update speed of the sub-FB learning value Vafsfbg) is suppressed as much as possible. Therefore, according to this specific embodiment, hunting of the sub-FB learning value Vafsfbg is suppressed as much as possible. As a result, the sub-FB learning value Vafsfbg more quickly converges.

8. A Further Specific Example

Figure 21:
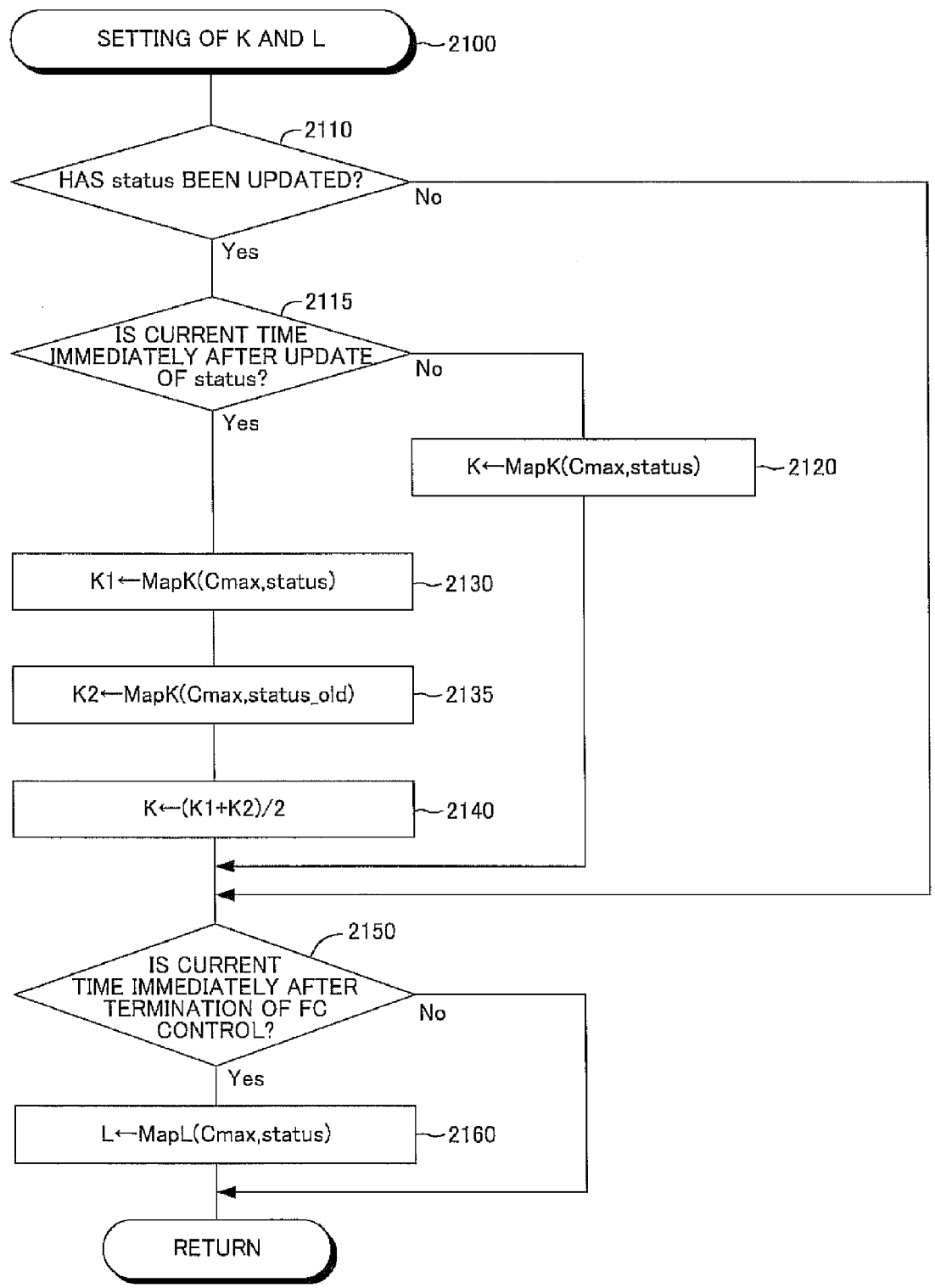
FIG. 21 is a flowchart illustrating a further specific example of the routine executed by the CPU of the electric controller illustrated in FIG. 1 to set the adjustment value and the update inhibition frequency.

Next, an example where the routine illustrated in FIG. 14 is partially altered is described referring to FIG. 21. The CPU repeatedly executes a routine 2100 illustrated in FIG. 21 to set the adjustment value K and the update inhibiting frequency L when each predetermined time elapses or at the timing of each fuel injection start time for the cylinder 21 which is going to undergo an intake stroke after the start of the engine 2.

Therefore, at the predetermined timing after the start of the engine 2, the CPU starts processing in Step 2110 illustrated in FIG. 21. Processing in Steps 2110, 2120, 2150, and 2160 of the routine 2100 illustrated in FIG. 21 is the same as the processing in Steps 1410, 1420, 1450, and 1460 illustrated in FIG. 14, respectively. Therefore, in the following, a difference of the routine 2100 from the routine 1400 illustrated in FIG. 14 is mainly described.

When the "status" is updated (Step 2110=Yes), the processing proceeds to Step 2115 where it is determined whether or not the current time is immediately after the latest update time of the "status" (before elapse of a predetermined period of time from the latest update time).

When the current time is not immediately after the update of "status" (Step 2115=No), the processing proceeds to Steps 2120 and 2150. In Step 2120, the adjustment value K is determined based on the table MapK(Cmax, status), the maximum oxygen storage amount Cmax of the upstream-side catalyst 43, and the current value of the "status" as in the case of Step 1402 described above.

On the other hand, when the current time is immediately after the update of the "status" (Step 2115=Yes), the processing proceeds to Steps 2130 to 2140. In Step 2130, a value K1 is acquired based on the table MapK(Cmax, status), the maximum oxygen storage amount Cmax of the upstream-side catalyst 43, and the current value of "status". Next, in Step 2135, a value K2 is acquired based on the table MapK(Cmax, status), the maximum oxygen storage amount Cmax of the upstream-side catalyst 43, and the previous value status_old of the "status". Then, in Step 2140, the adjustment value K is determined to be a value between the values K1 and K2. More specifically, the adjustment value K is determined to be an average value of the values K1 and K2. Thereafter, the processing proceeds to Step 2150.

Specifically, in this specific example, at the time immediately after the result of determination (setting) of the "status" becomes different, the adjustment value K is determined to be the value between the value K1 to be changed and the value K2 before the determination (Steps 2110, 2115, 2130, 2135, and 2140). As a result, an abrupt change of the adjustment value K can be suppressed. Thereafter, the adjustment value K is determined, as in general, based on the table MapK (Cmax, status), the maximum oxygen storage amount Cmax of the upstream-side catalyst 43, and the current value of the "status".

As described above, in this specific example, at the time immediately after the result of determination (setting) of the "status" becomes different, the adjustment value K is set to the intermediate value of the values before and after the determination. As a result, the gradual change in update speed of the sub-FB learning value Vafsfbg when the result of determination (setting) of the "status" becomes different can be easily and reliably performed.

9. Listing of Exemplary Modified Examples

The embodiment described above is a mere example of a representative embodiment of the present invention, which is considered to be the best by the applicant at the time of filing of the subject application. Therefore, the present invention is not originally limited to the embodiment described above. Therefore, it is apparent that various changes can be made in the embodiment described above without changing the essential part of the present invention.

Hereinafter, some representative modified examples are described as examples. Obviously, however, even the modified examples are not limited to those listed below. All or a part of a plurality of modified examples can be appropriately used in combination as long as a technical contradiction does not occur. The present invention (in particular, a component represented in terms of action and function in components constituting means or portion configured to solve the problem to be solved by the present invention should not be unfairly read in a limitative manner based on the description of the embodiment described above and the modified examples described below.

The upstream-side catalyst 43 may be another type of catalyst (for example, an oxidation catalyst) as long as the catalyst has a purifying function by oxidizing hydrogen $H_2$.

The downstream-side air-fuel ratio sensor 56 may have, for example, the same configuration (however, except for the power source 55h) as that of the upstream-side air-fuel ratio sensor 55 illustrated in FIG. 2. Alternatively, the downstream-side air-fuel ratio sensor 56 may include a test-tube like solid electrolyte layer, an exhaust-gas side electrode layer formed on the outer side of the solid electrolyte layer, an atmosphere-side electrode layer formed on the solid electrolyte layer so as to be exposed in an atmospheric chamber (on the inner side of the solid electrolyte layer) and opposed to the exhaust-gas side electrode layer through the solid electrolyte layer therebetween, and a diffusion resistance layer provided so as to cover the exhaust-gas side electrode and be in contact with the exhaust gas (provided so as to be exposed to the exhaust gas).

A non-volatile memory such as an EEPROM may be used in place of the backup RAM.

The acquisition of the in-cylinder intake air amount Mc(k) in Step 1010 may be performed by a calculation using a well-known air model (calculation model constructed in accordance with the law of physics, which simulates a behavior of air in the intake passage).

In place of the load factor KL in Step 1105 and the like, the accelerator pedal operation amount Accp, the throttle-valve opening degree TA, and the like may be used as the load of the engine.

In Step 1205, another condition (i.e., condition in which the load KL falls within a predetermined range) may be added to the above-mentioned sub-feedback control condition.

In Step 1725, the determination width ΔVafsfbg may be different between the case where the "status" is changed from the specific "status" in the stable direction and the case where the "status" is changed from the same "status" in the unstable direction. Specifically, in the above-mentioned example, the determination width ΔVafsfbg for determining whether or not to change the "status" from the status 1 to the status 0 and the determination width ΔVafsfbg for determining whether or not to change the "status" from the status 1 to the status 2 may be different (the former width may be larger than the latter width). More specifically, in this case, the third determination width ΔVafsfbg3 for changing the state from the status 1 to the status 2 is set smaller than the second determination width ΔVafsfbg2 for changing the "status" from the status 1 to the status 2.

For example, when the result of determination is "Yes" in Step 1785 or 2085, processing of increasing the adjustment value K or decreasing the update inhibiting frequency L may be performed. With the processing, the gradual change of the update speed of the sub-FB learning value Vafsfbg, which suppresses the occurrence of hunting of the sub-FB learning value Vafsfbg, can be more delicately performed.

The number of steps of the "status" may be four or more.

Although the present invention is suitably applied to the imbalance abnormality determination, the present invention is also applicable to an accidental-fire occurrence determination in place of the imbalance abnormality determination. Specifically, for example, the occurrence of an abnormality state in which an accidental-fire rate becomes equal to or larger than an allowable rate is determined based on the sub-FB learning value Vafsfbg (time integral value SDVoxs) being equal to or smaller than a predetermined value (whether or not the sub-FB learning value Vafsfbg has become a negative value whose absolute value is equal to or larger than the predetermined value). The determination described above is possible for the following reason.

When an accidental fire occurs, the mixture of the fuel and air flows from the interior of the cylinders 21 through the upstream-side air-fuel ratio sensor 55 into the upstream-side catalyst 43. Then, a large part of the mixture flowing into the upstream-side catalyst 43 is subjected to a combustion (oxidation) process in the upstream-side catalyst 43 to flow out from the upstream-side catalyst 43 as a combustion gas. Therefore, when the accidental fire occurs, the case where the mixture itself reaches the upstream-side air-fuel ratio sensor 55 whereas the combustion gas of the mixture reaches the downstream-side air-fuel ratio sensor 56 may occur.

In general, the mixture of the stoichiometric air-fuel ratio (or the air-fuel ratio in the vicinity of the stoichiometric air-fuel ratio) comes into contact with a detection section of the air-fuel ratio sensor, the air-fuel ratio sensor outputs a value indicating a lean air-fuel ratio in many cases. This is considered to be because the sensitivity of the air-fuel sensor with respect to oxygen in the mixture is higher than that with respect to the other components in the mixture.

Therefore, each time the accidental fire occurs, the air-fuel ratio of the mixture supplied to the engine 2 is subjected to the feedback control to be shifted toward the rich side in response to the output of the value indicating a lean air-fuel ratio by the upstream-side air-fuel ratio sensor 55 (even when the air-fuel ratio of the mixture is in the vicinity of the stoichiometric air-fuel ratio). In order to compensate for the average shift of the air-fuel ratio in the rich direction, the downstream-side air-fuel ratio sensor 56 outputs a value indicating a rich air-fuel ratio. As a result, an integral term of the sub-feedback amount Vafsfb converges toward the convergence value which is shifted in the lean direction. Therefore, based on the sub-feedback amount Vafsfb, it can be determined that the accidental-fire rate becomes equal to or higher than the allowable rate.

In the embodiment described above, the average value Avesfbg of the sub-FB learning value is used as the parameter for imbalance determination. It is apparent that the sub-FB learning value Vafsfbg itself obtained when the abnormality determination permitting condition is satisfied may be used in place of the average value Avesfbg as the parameter for imbalance determination.

Moreover, as disclosed in Japanese Patent Application Laid-open Nos. 2007-77869, 2007-146661, and 2007-162565, for example, a difference between the upstream-side air-fuel ratio "abyfs" obtained based on the output value Vabyfs of the upstream-side air-fuel ratio sensor 55 and the upstream-side target air-fuel ratio "abyfr" is subjected to highpass filter processing to calculate a main feedback amount KFmain. At the same time, a value obtained by lowpass filter processing on a deviation between the output value Voxs of the downstream-side air-fuel ratio sensor 56 and the downstream-side target value Voxsref is subjected to proportional integral processing to obtain a sub-feedback amount Fisub. In this case, as expressed by the following Equation (11), the feedback amounts are used for the correction of the basic fuel injection amount Fbase in a mode in which the feedback amounts are independent of each other. As a result, the final fuel injection amount Fi can be obtained.

$$Fi = KFmain \times Fbase + Fisub \quad (11)$$

Further, the sub-FB learning value Vafsfbg can be updated in accordance with the following Equation (12) or (13). A left side Vafsfbg(k+1) of each of Equations (12) and (13) represents the sub-FB learning value Vafsfbg after being updated. A value p is an arbitrary value equal to or larger than 0 and smaller than 1.

$$Vafsfbg(k+1) = p \times Vafsfbg + (1-p) \times Ki \times SDVoxs \quad (12)$$

$$Vafsfbg(k+1) = p \times Vafsfbg + (1-p) \times Vafsfb \quad (13)$$

In this case, the update speed of the learning value Vafsfbg becomes larger as the value p becomes smaller. Therefore, the value p is set to a value p1 when the "status" is the status 0, the value p is set to a value p2 larger than the value p1 when the "status" is the status 1, and the value p is set to a value p3 which is larger than the value p2 when the "status" is the status 2. In this manner, the update speed of the learning value Vafsfbg can be set to any one of first to third update speeds.

Besides, it is apparent that even modified examples, which are not especially referred to, are encompassed in the scope of the present invention without changing the essential part of the present invention. Moreover, an element represented in terms of action or function in the elements constituting the means for solving the problem to be solved by the present invention includes any structure which can realize the actions and functions in addition to the specific structures disclosed in the embodiment and the modified examples described above. Further, the contents (including the specifications and drawings) of disclosure of the prior applications and the patent publications cited in this specification can be incorporated as a part of this specification.

What is claimed is:

1. An internal combustion engine system controller for controlling an internal combustion engine system,
the internal combustion engine system comprising:
an internal combustion engine having a plurality of cylinders;
a plurality of fuel injection valves provided so as to respectively correspond to the plurality of cylinders;
an exhaust-gas purification catalyst disposed in an exhaust passage on a downstream side of an exhaust-gas accumulating portion, in which an exhaust gas from the plurality of cylinders accumulates, in an exhaust-gas flowing direction;
a downstream-side air-fuel ratio sensor disposed in the exhaust passage at a position on the downstream side of the exhaust-gas purification catalyst in the exhaust-gas flowing direction, for generating an output corresponding to an air-fuel ratio of the exhaust gas at the position where the downstream-side air-fuel ratio sensor is disposed; and
an upstream-side air-fuel ratio sensor disposed in the exhaust passage at a position on an upstream side of the exhaust-gas purification catalyst and the downstream-side air-fuel ratio sensor in the exhaust-gas flowing direction, for generating an output corresponding to the air-fuel ratio of the exhaust gas at the position where the upstream-side air-fuel ratio sensor is disposed,
the internal combustion engine system controller comprising:
a sub-feedback learning portion configured to acquire a sub-feedback learning value being an amount corresponding to a steady component of a sub-feedback amount, the sub-feedback amount corresponding to a control amount for performing feedback control on a fuel injection amount by each of the plurality of fuel injection valves so that the air-fuel ratio of the exhaust gas corresponding to the output of the downstream-side air-fuel ratio sensor becomes equal to a stoichiometric air-fuel ratio;
a state determining portion configured to repeatedly determine, to which of at least three states including:
(a) a stable state in which a fluctuating state of the sub-feedback learning value is stable;
(b) an unstable state in which the fluctuating state greatly fluctuates; and
(c) an intermediate state between the stable state and the unstable state, the fluctuating state of the sub-feedback learning value corresponds; and
a learning update-speed setting portion configured to set an update speed of the sub-feedback learning value by the sub-feedback learning portion in accordance with a result of determination by the state determining portion so that the update speed becomes higher in the unstable state than in the intermediate state and higher in the intermediate state than in the stable state,
wherein the state determining portion is configured:
so as to determine the fluctuating state of the sub-feedback learning value in such a manner that the fluctuating state shifts between the stable state and the intermediate state or between the intermediate state and the unstable state; and
so as to change the fluctuating state of the sub-feedback learning value when a shift pattern of the fluctuating state of the sub-feedback learning value determined by the state determining portion is identical with a predetermined pattern, the shift pattern being represented by a previous fluctuating state (status_old) which is the fluctuating state at a point in time at which the determination was previously made by the state determining portion, a current fluctuating state (status_now) which is the current fluctuating state at a point in time at which the determination is currently made by the state determining portion, and a next fluctuating state (status_next) which is the fluctuating state currently determined by the state determining portion.

2. An internal combustion engine system controller according to claim 1, wherein:
the state determining portion is configured in such a manner that the state determining portion does not change the fluctuating state when the shift pattern is not identical with the predetermined pattern, but changes the fluctuating state if the next fluctuating state (status_next) currently determined is the same as a previous next fluctuating state previously determined even when the shift pattern is not identical with the predetermined pattern.

3. An internal combustion engine system controller according to claim 1, wherein the state determining portion is configured to:
shift the result of determination of the fluctuating state by one step from the unstable state to the intermediate state when the sub-feedback learning value falls within a range of a predetermined first determination width from a criterion value obtained by processing the sub-feedback learning value with a lowpass filter, and shift the result of determination of the fluctuating state by one step from the intermediate state to the unstable state when the sub-feedback learning value does not fall within a range of a predetermined second determination width smaller than the predetermined first determination width from the criterion value; and shift the result of determination of the fluctuating state by one step from the intermediate state to the stable state when the sub-feedback learning value falls within a range of a predetermined third determination width from the criterion value, and shift the result of determination of the fluctuating state by one step from the stable state to the intermediate state when the sub-feedback learning value does not fall within a range of a predetermined fourth determination width smaller than the third predetermined determination width from the criterion value.

4. An internal combustion engine system controller according to claim 3, wherein the state determining portion is configured to change a parameter of the lowpass filter in accordance with the result of determination of the fluctuating state.

5. An internal combustion engine system controller for controlling an internal combustion engine system, the internal combustion engine system comprising:
- an internal combustion engine having a plurality of cylinders;
- a plurality of fuel injection valves provided so as to respectively correspond to the plurality of cylinders;
- an exhaust-gas purification catalyst disposed in an exhaust passage on a downstream side of an exhaust-gas accumulating portion, in which an exhaust gas from the plurality of cylinders accumulates, in an exhaust-gas flowing direction;
- a downstream-side air-fuel ratio sensor disposed in the exhaust passage at a position on the downstream side of the exhaust-gas purification catalyst in the exhaust-gas flowing direction, for generating an output corresponding to an air-fuel ratio of the exhaust gas at the position where the downstream-side air-fuel ratio sensor is disposed; and
- an upstream-side air-fuel ratio sensor disposed in the exhaust passage at a position on an upstream side of the exhaust-gas purification catalyst and the downstream-side air-fuel ratio sensor in the exhaust-gas flowing direction, for generating an output corresponding to the air-fuel ratio of the exhaust gas at the position where the upstream-side air-fuel ratio sensor is disposed, the internal combustion engine system controller comprising:

a sub-feedback learning portion configured to acquire a sub-feedback learning value being an amount corresponding to a steady component of a sub-feedback amount, the sub-feedback amount corresponding to a control amount for performing feedback control on a fuel injection amount by each of the plurality of fuel injection valves so that the air-fuel ratio of the exhaust gas corresponding to the output of the downstream-side air-fuel ratio sensor becomes equal to a stoichiometric air-fuel ratio;

a state determining portion configured to repeatedly determine, to which of at least three states including:
(a) a stable state in which a fluctuating state of the sub-feedback learning value is stable;
(b) an unstable state in which the fluctuating state greatly fluctuates; and
(c) an intermediate state between the stable state and the unstable state, the fluctuating state of the sub-feedback learning value corresponds; and a learning update-speed setting portion configured to set an update speed of the sub-feedback learning value by the sub-feedback learning portion in accordance with a result of determination by the state determining portion so that the update speed becomes higher in the unstable state than in the intermediate state and higher in the intermediate state than in the stable state, wherein the learning update-speed setting portion is configured to permit the update speed to be changed when a shift pattern of the fluctuating state determined by the state determining portion is identical with a predetermined pattern, the shift pattern being represented by a previous fluctuating state (status_old) which is the fluctuating state at a point in time at which the determination was previously made by the state determining portion, a current fluctuating state (status_now) which is the current fluctuating state at a point in time at which the determination is currently made by the state determining portion, and a next fluctuating state (status_next) which is the fluctuating state currently determined by the state determining portion.

6. An internal combustion engine system controller according to claim 5, further comprising an abnormality determining portion configured to perform an imbalance abnormality determination corresponding to a determination of whether or not a deviation in air-fuel ratio between the plurality of cylinders has become excessive based on the sub-feedback learning value, wherein,
the abnormality determining portion is configured to perform the imbalance abnormality determination when the fluctuating state at present is the stable state.

7. An internal combustion engine system controller according to claim 1, further comprising an abnormality determining portion configured to perform an imbalance abnormality determination corresponding to a determination of whether or not a deviation in air-fuel ratio between the plurality of cylinders has become excessive based on the sub-feedback learning value, wherein
the abnormality determining portion is configured to perform the imbalance abnormality determination when the fluctuating state at present is the stable state.

8. An internal combustion engine system controller according to claim 2, further comprising an abnormality determining portion configured to perform an imbalance abnormality determination corresponding to a determination of whether or not a deviation in air-fuel ratio between the plurality of cylinders has become excessive based on the sub-feedback learning value, wherein,
the abnormality determining portion is configured to perform the imbalance abnormality determination when the fluctuating state at present is the stable state.

9. An internal combustion engine system controller according to claim 3, further comprising an abnormality determining portion configured to perform an imbalance abnormality determination corresponding to a determination of whether or not a deviation in air-fuel ratio between the plurality of cylinders has become excessive based in the sub-feedback learning value, wherein,
the abnormality determining portion is configured to perform the imbalance abnormality determination when the fluctuating state at present is the stable state.

10. An internal combustion engine system controller according to claim 4, further comprising an abnormality determining portion configured to perform an imbalance abnormality determination corresponding to a determination of whether or not a deviation in air-fuel ratio between the plurality of cylinders has become excessive based on the sub-feedback learning value,
wherein,
the abnormality determining portion is configured to perform the imbalance abnormality determination when the fluctuating state at present is the stable state.

11. An internal combustion engine system controller according to claim 2, wherein the state determining portion is configured to:
shift the result of determination of the fluctuating state by one step from the unstable state to the intermediate state when the sub-feedback learning value falls within a range of a predetermined first determination width from a criterion value obtained by processing the sub-feedback learning value with a lowpass filter, and shift the result of determination of the fluctuating state by one step from the intermediate state to the unstable state when the sub-feedback learning value does not fall within a range of a predetermined second determination width smaller than the predetermined first determination width from the criterion value; and
shift the result of determination of the fluctuating state by one step from the intermediate state to the stable state when the sub-feedback learning value falls within a range of a predetermined third determination width from the criterion value, and shift the result of determination of the fluctuating state by one step from the stable state to the intermediate state when the sub-feedback learning value does not fall within a range of a predetermined fourth determination width smaller than the third predetermined determination width from the criterion value.

12. An internal combustion engine system controller according to claim 11, further comprising an abnormality determining portion configured to perform an imbalance abnormality determination corresponding to a determination of whether or not a deviation in air-fuel ratio between the plurality of cylinders has become excessive based on the sub-feedback learning value,
wherein,
the abnormality determining portion is configured to perform the imbalance abnormality determination when the fluctuating state at present is the stable state.

\* \* \* \* \*